US006948769B2

(12) United States Patent
Borkowski et al.

(10) Patent No.: US 6,948,769 B2
(45) Date of Patent: Sep. 27, 2005

(54) VEHICLE FRONT END STRUCTURE

(75) Inventors: Slav Borkowski, Commerce Township, MI (US); Mike Smith, Highland, MI (US); Youichi Yamamoto, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 10/740,589

(22) Filed: Dec. 22, 2003

(65) Prior Publication Data

US 2005/0134093 A1    Jun. 23, 2005

(51) Int. Cl.[7] .................................................. B60J 7/00
(52) U.S. Cl. ........................ 296/203.02; 296/193.09; 296/194; 180/68.4
(58) Field of Search .................... 296/193.09, 193.1, 296/203.02

(56) References Cited

U.S. PATENT DOCUMENTS

| | | | | |
|---|---|---|---|---|
| 5,123,695 | A | * | 6/1992 | Kanemitsu et al. .... 296/193.09 |
| 5,271,473 | A | * | 12/1993 | Ikeda et al. ................ 180/68.4 |
| 6,086,144 | A | | 7/2000 | Kuwano ..................... 296/192 |
| 6,227,321 | B1 | * | 5/2001 | Frascaroli et al. ......... 180/68.4 |
| 6,273,496 | B1 | * | 8/2001 | Guyomard et al. .... 296/193.09 |
| 6,334,645 | B1 | * | 1/2002 | Ban ............................ 296/198 |
| 6,450,276 | B1 | * | 9/2002 | Latcau ....................... 180/68.4 |
| 6,685,258 | B2 | * | 2/2004 | Brogly et al. ........... 296/203.02 |
| 2001/0010275 | A1 | * | 8/2001 | Sasano et al. ............. 180/68.1 |
| 2001/0026082 | A1 | * | 10/2001 | Ozawa et al. ............... 296/194 |
| 2002/0008408 | A1 | | 1/2002 | Tilsner et al. .......... 296/193.09 |
| 2002/0040819 | A1 | | 4/2002 | Miyata ...................... 180/68.5 |
| 2002/0190542 | A1 | * | 12/2002 | Takeuchi et al. ............ 296/194 |
| 2002/0195839 | A1 | | 12/2002 | Nishijima .............. 296/203.02 |
| 2003/0160477 | A1 | | 8/2003 | Sasano et al. ......... 296/203.02 |
| 2004/0160088 | A1 | * | 8/2004 | Staargaard et al. .... 296/193.09 |

FOREIGN PATENT DOCUMENTS

| | | | | |
|---|---|---|---|---|
| JP | 63312279 | A | * 12/1988 | ............ 296/203.01 |
| JP | 02249772 | A | * 10/1990 | ............ 296/203.01 |

* cited by examiner

*Primary Examiner*—Kiran B. Patel
(74) *Attorney, Agent, or Firm*—Shinjyu Global IP Counselors, LLP

(57) ABSTRACT

A vehicle front end structure has a firewall structure and a pair of hood ledge structures that extend in a cantilevered manner. Each of the hood ledge structures has a vehicle frame mounting part for coupling its free end to the vehicle chassis. Thus, the hood ledge structures are configured and arranged to be separately supported by the firewall structure to form an unobstructed space between the hood ledge structures. A front end module is fixedly coupled to the hood ledge structures at a pair of upper attachment points and at pair of lower attachment points. The lower attachment points are offset inwardly relative to the upper attachment points. The front end module and the hood ledge structures are provided with mating guide members that have horizontal and vertical guide portions to aid in the installation of the front end module on the hood ledge structures.

38 Claims, 27 Drawing Sheets

US 6,948,769 B2

VEHICLE FRONT END STRUCTURE

BACKGROUND OF THE INVENTION

1. Field of the Invention

The present invention generally relates to a vehicle front end structure. More specifically, the present invention relates to a vehicle front end structure that is mounted to a pair of hood ledges of a frame mounted vehicle body.

2. Background Information

Recently, many of the components of the front end of a vehicle have been modularized into a single unit or front end module that can be attached to the vehicle frame. In other words, the front end module is provided with a frame with various front end components such as the radiator and headlamps coupled thereto. Thus, instead of individually installing the various front end components to the vehicle body, the various front end components are installed on a frame structure that is installed on the front end of the vehicle as a single unit. By using a front end module, the time required to assemble the front end of the vehicle has been drastically reduced.

One example of a vehicle front end module installed on a unibody or monocoque frame is disclosed in U.S. Pat. Publication No. 2002/0040819. This publication discloses a front end construction of a vehicle body in which the front end module is fixed to the vehicle body adjacent the suspension attachment portions of the vehicle body. The front end of the vehicle body in this publication has a cross member extending between the front side frame members to add lateral stability to the vehicle body.

Another example of a front end module installed on a unibody or monocoque frame is disclosed in U.S. Pat. Publication No. 2002/0195839. This publication discloses the front end module being attached to the front fenders of the vehicle body by using a jig for lateral stability. To aid in the assembly of the front end module, this publication discloses using a pair of hood ledge reinforcements that increase the positional accuracy of the mounting points of the front end module.

Also the use of a guide structure for a front end module has been proposed in U.S. Pat. Publication No. 2003/0160477 to aid in the assembly of the front end module onto a vehicle body. This publication discloses using positioning pins on the front end module and positioning holes on the front fender to aid in the assembly of the front end module.

In view of the above, it will be apparent to those skilled in the art from this disclosure that there exists a need for an improved vehicle structure for mounting a front end module to a vehicle body. This invention addresses this need in the art as well as other needs, which will become apparent to those skilled in the art from this disclosure.

SUMMARY OF THE INVENTION

It has been discovered that vehicles having a unibody construction typically need a cross member or some other connection between the front ends of the hood ledges to properly align and secure the front end module to the vehicle body. However, this cross member obstructs access to the engine during the assembly process of the vehicle. However, if a cross member is not provided between the front ends of the hood ledges, then a vehicle with a unibody construction does not have sufficient lateral rigidity.

Moreover, it has been discovered that in some prior front end modules, the installation of the front end module to the hood ledges sometimes results in the scratching or damaging of components of the front end module. As mentioned above, in U.S. Pat. Publication No. 2003/0160477, the guide pins are sometimes provided to assist in the assembly the front end module to the hood ledges. However, these guide pins are very short and are not arranged in a manner to prevent misalignment of the front end module relative to the hood ledges prior to the guide pins being inserted into the holes of the hood ledges. In other words, prior to the guide pins being inserted into the holes of the hood ledges, the front end module can still be misaligned and scratching or damaging of components of the front end module can occur when trying to get the guide pins into the holes of the hood ledges. Also, the use of guide pins and holes require the front end module to be inserted in a front to rear direction only. Thus, assembly of the front end module is limited when guide pins and holes are utilized for alignment of the front end module to the hood ledges.

The present invention was developed in view of these above mentioned concerned. In accordance with one aspect of the invention, a vehicle front end structure is provided that provides more flexibility in the assembly techniques that are utilized in installing the front end module. In particular, in the present invention, the front end module can be aligned front to rear, top to bottom or any angles therebetween.

In view of foregoing, a vehicle front end structure is provided that comprises a front end module support structure, a first side horizontal guide portion, a first side vertical guide portion, a second side horizontal guide portion, and a second side vertical guide portion. The front end module support structure includes center support portion, a first side mounting portion located at a first lateral end of the center support portion and a second side mounting portion located at a second lateral end of the center support portion. The first side horizontal guide portion includes a first horizontal planar surface extending in a horizontal direction of the front end module support structure and disposed adjacent the first side mounting portion. The first side vertical guide portion includes a first vertical planar surface extending in a vertical direction of the front end module support structure and disposed adjacent the first side mounting portion. The second side horizontal guide portion includes a second horizontal planar surface extending in the horizontal direction of the front end module support structure and disposed adjacent the second side mounting portion. The second side vertical guide portion includes a second vertical planar surface extending in the vertical direction of the front end module support structure and disposed adjacent the second side mounting portion.

In accordance with another aspect of the invention, a vehicle front end structure is provided that comprises a first side hood ledge structure and a second side hood ledge structure. The first side hood ledge structure including a first front end mounting section having a first upper front end module attachment part, a first lower front end module attachment part and a first guide member. The first guide member has a first side vertical guide portion including a first vertical planar surface extending in a vertical direction and a first side horizontal guide portion including a first horizontal planar surface extending in a horizontal direction. The second side hood ledge structure is provided with a second front end mounting section having a second upper front end module attachment part, a second lower front end module attachment part and a second guide member. The second guide member has a second side vertical guide portion including a second vertical planar surface extending in the vertical direction and a second side horizontal guide portion including a second horizontal planar surface extending in the horizontal direction.

In accordance with another aspect of the invention, a vehicle front end structure is provided that comprises a firewall structure, a first side hood ledge structure and a second side hood ledge structure. The firewall structure has a first lateral end and a second lateral end. The first side hood ledge structure includes a first rear end section coupled to the first lateral end of the firewall structure, and a first front end mounting section having a first upper front end module attachment part, a first lower front end module attachment part and a first vehicle frame mounting part. The second side hood ledge structure is provided with a second rear end section coupled to the second lateral end of the firewall structure, and a second front end mounting section having a second upper front end module attachment part, a second lower front end module attachment part and a second vehicle frame mounting part. The first and second side hood ledge structures is configured and arranged to be separately supported by the firewall structure to form an unobstructed space between the first and second side hood ledge structures.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1–4, a vehicle 10 is illustrated that has a vehicle body 12 and a front end module 14 in accordance with the present invention. The vehicle body 12 is configured and arranged to be mounted on a chassis or frame 16. While the vehicle 10 is illustrated as a pickup truck, it will be apparent to those skilled in the art from this disclosure that the present invention can be applied to other types of vehicles. In other words, the particular type of vehicle is not important to the present invention. Thus, the vehicle 10 will not be discussed or illustrated in detail herein, except to an extent that the parts of the vehicle 10 relate to the present invention.

Figure 1:
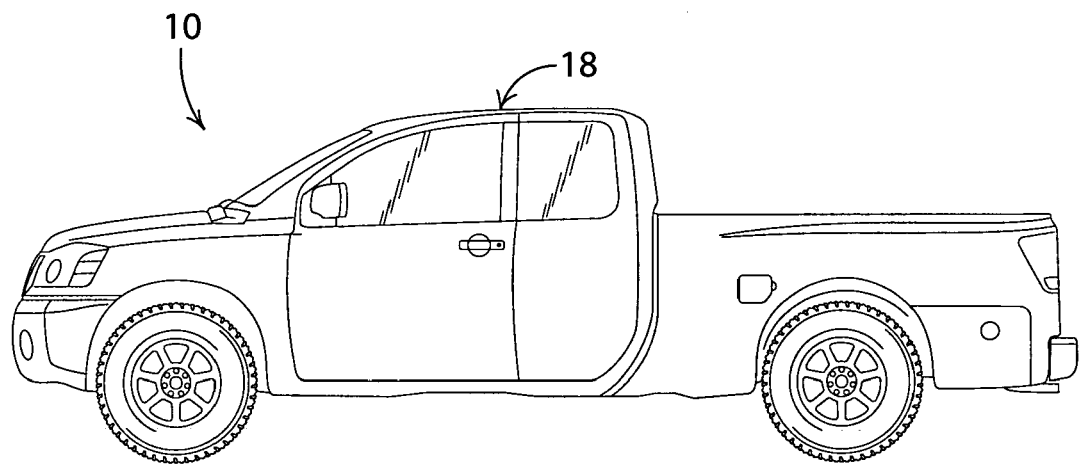
FIG. 1 is a side elevational view of a vehicle equipped with a vehicle front end structure in accordance with a preferred embodiment of the present invention.
Figure 2:
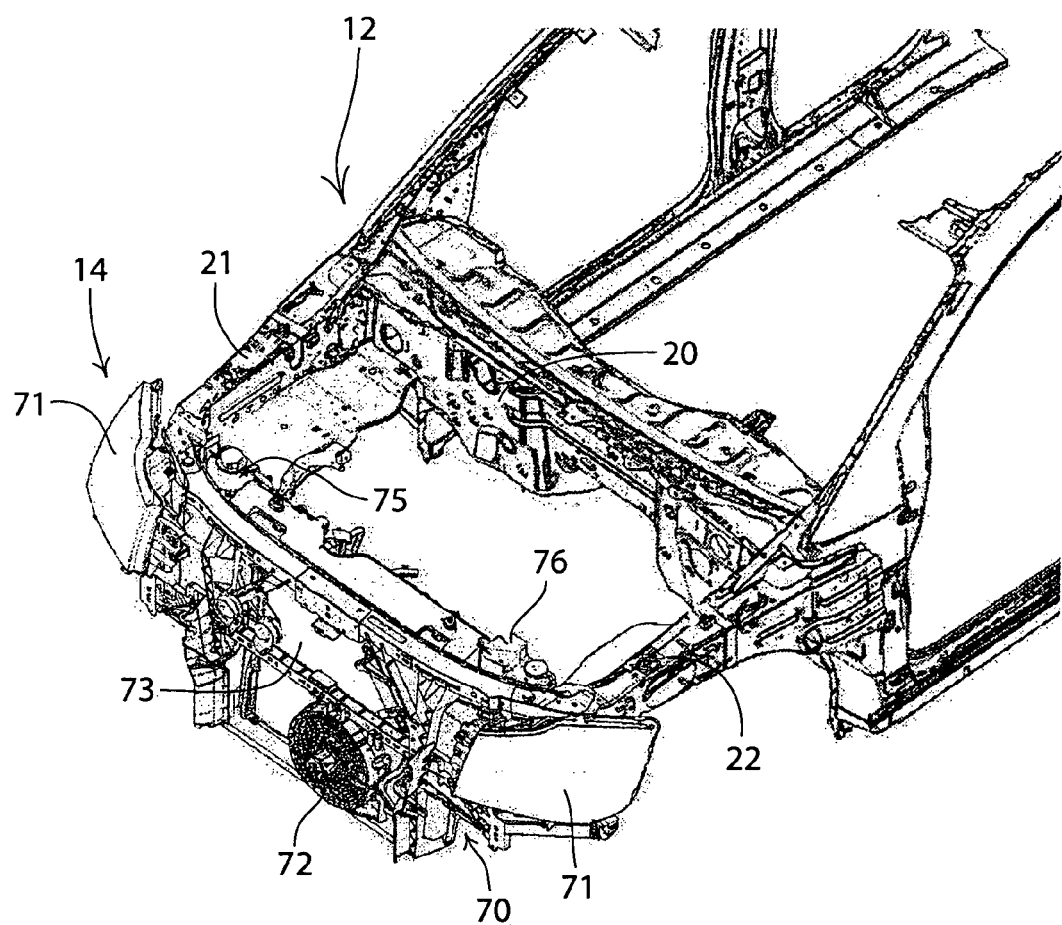
FIG. 2 is a partial perspective view of the vehicle front end structure of the vehicle body illustrated in FIG. 1 in which a front end module is fixedly coupled to a pair of hood ledges in accordance with the present invention.
Figure 3:
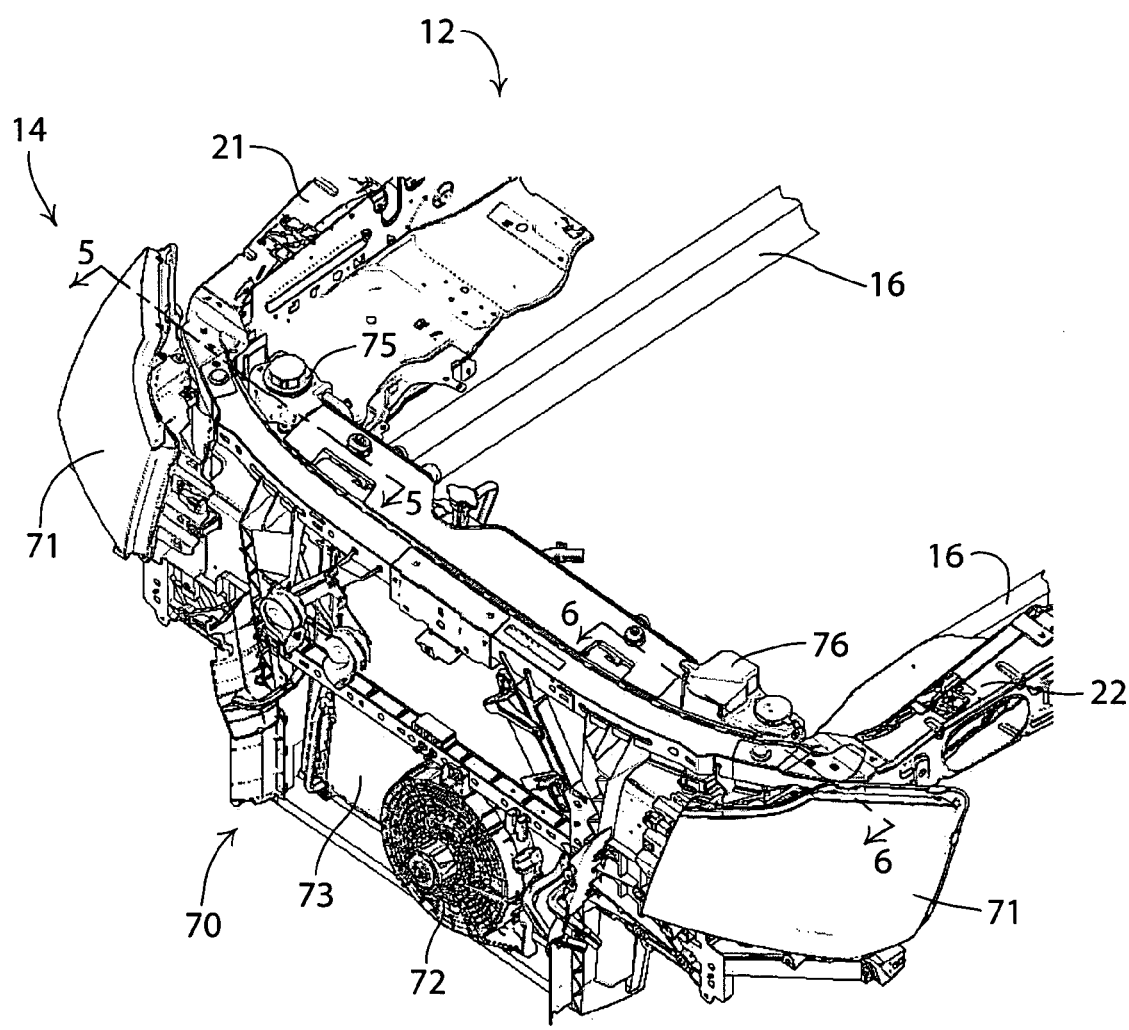
FIG. 3 is an enlarged partial perspective view of the front end module fixed to the hood ledges in accordance with the present invention.
Figure 4:
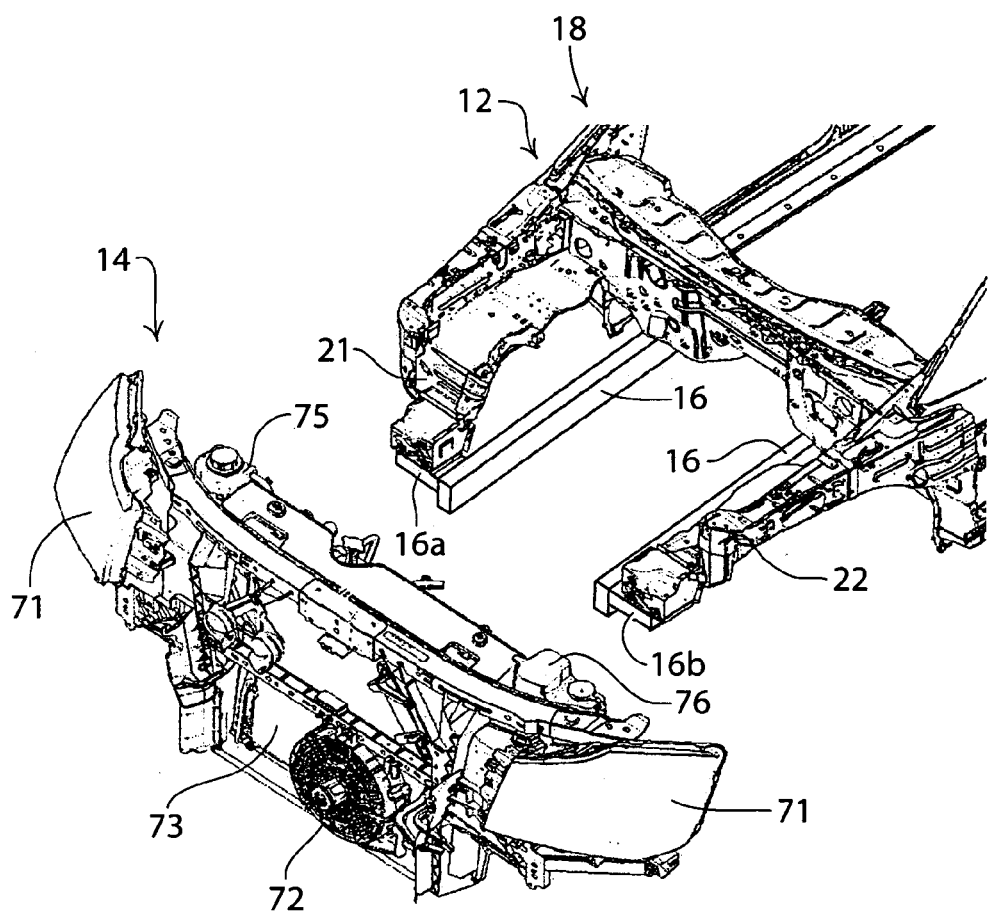
FIG. 4 is an exploded front perspective view of the front end module and the hood ledges of the vehicle body illustrated in FIGS. 1 and 2 in accordance with the present invention.
Figure 5:
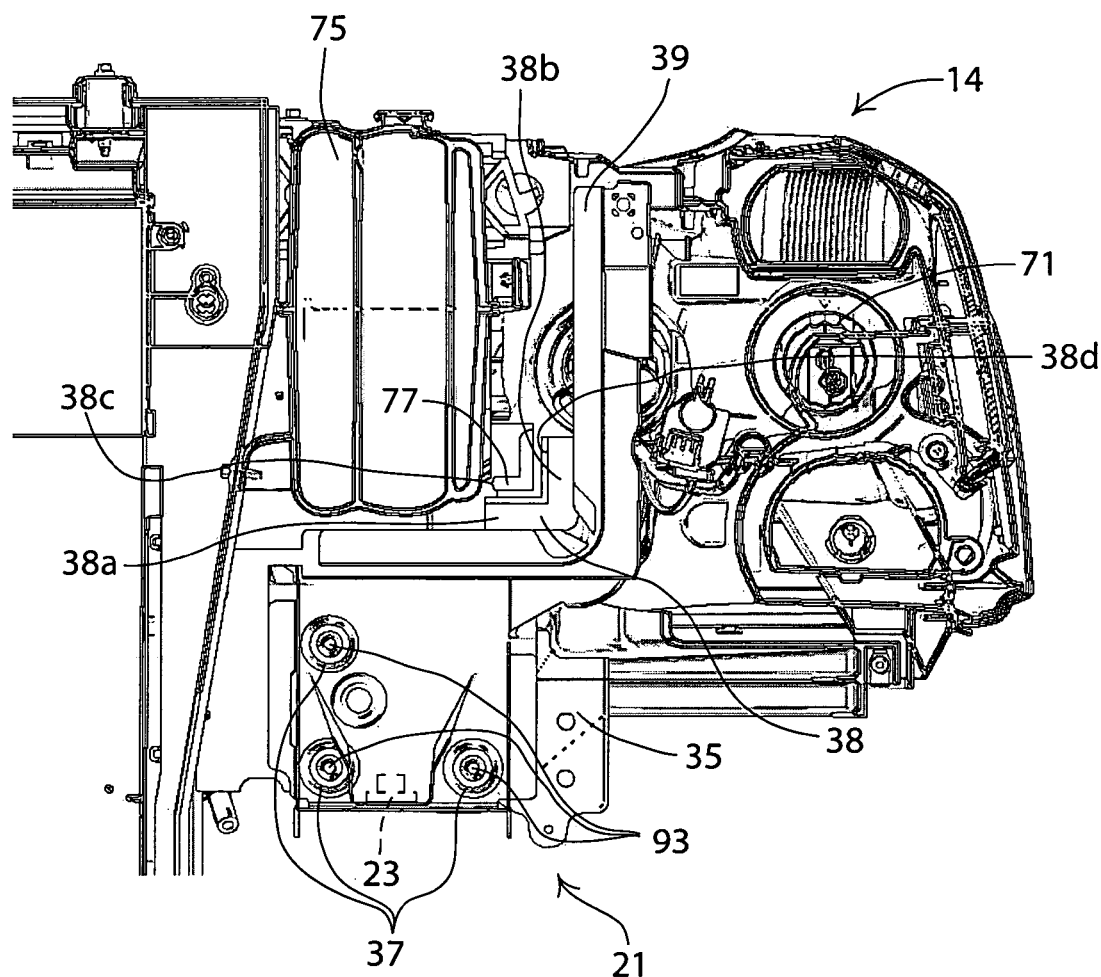
FIG. 5 is a partial cross sectional view of the right hand side of the front end module and the right hand side hood ledge as seen along section line 5—5 of FIG. 3.
Figure 6:
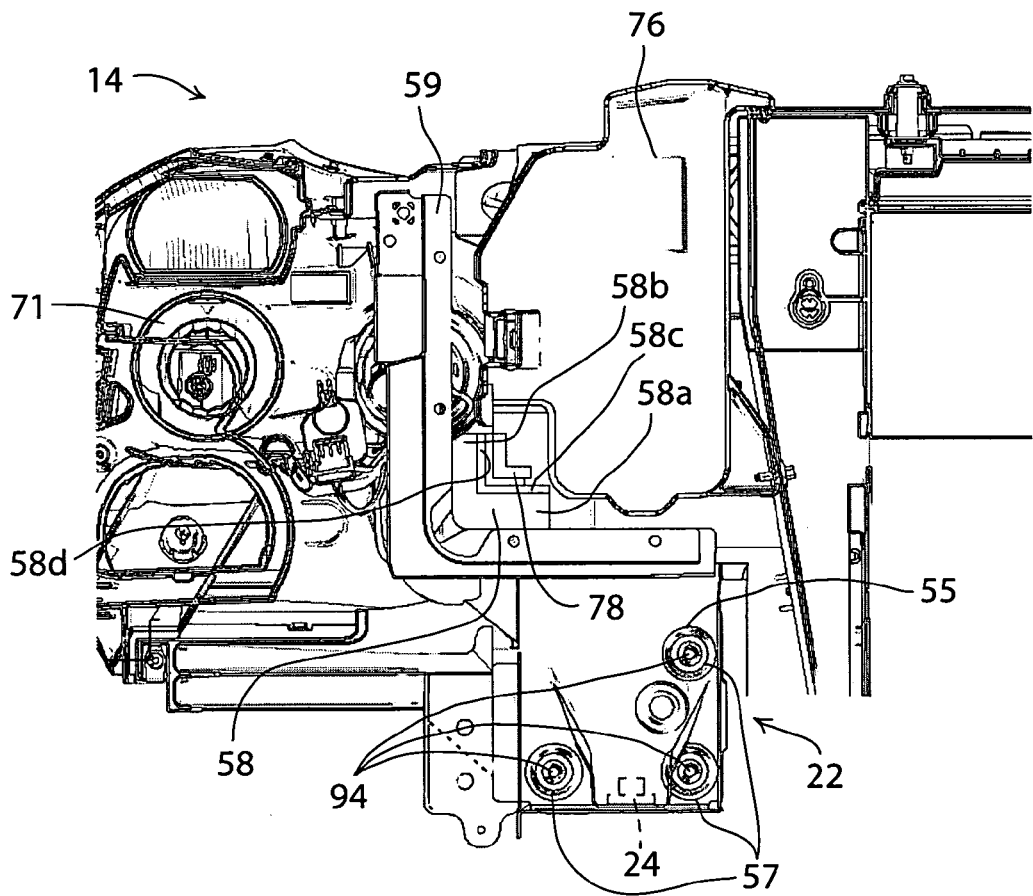
FIG. 6 is a partial cross sectional view of the left hand side of the front end module and the left hand side hood ledge as seen along section line 6—6 of FIG. 3.

As seen in FIGS. 2–4, the vehicle body 12 has a cab portion 18 that is mounted to the vehicle frame 16. The cab portion 18 includes a firewall structure 20 coupled thereto. A right hand side hood ledge structure 21 and a left hand side hood ledge structure 22 are coupled to the firewall structure 20 to form a portion of engine room of the vehicle 10. The firewall structure 20 and the hood ledge structures 21 and 22 are preferably constructed of sheet metal materials that are commonly used to form such structures. The hood ledge structures 21 and 22 are fixedly coupled to the firewall structure 20 in a cantilever fashion, i.e., without the free ends of the hood ledge structures 21 and 22 being coupled together prior to installation of the front end module 14. Accordingly, the hood ledge structures 21 and 22 allow for easy access to the engine area prior to the installation of the front end module 14 on to the free ends of the hood ledge structures 21 and 22. In other words, the hood ledge structures 21 and 22 are configured and arranged to be separately supported by the firewall structure 20 to form an unobstructed space between the hood ledge structures 21 and 22.

Figure 7A:
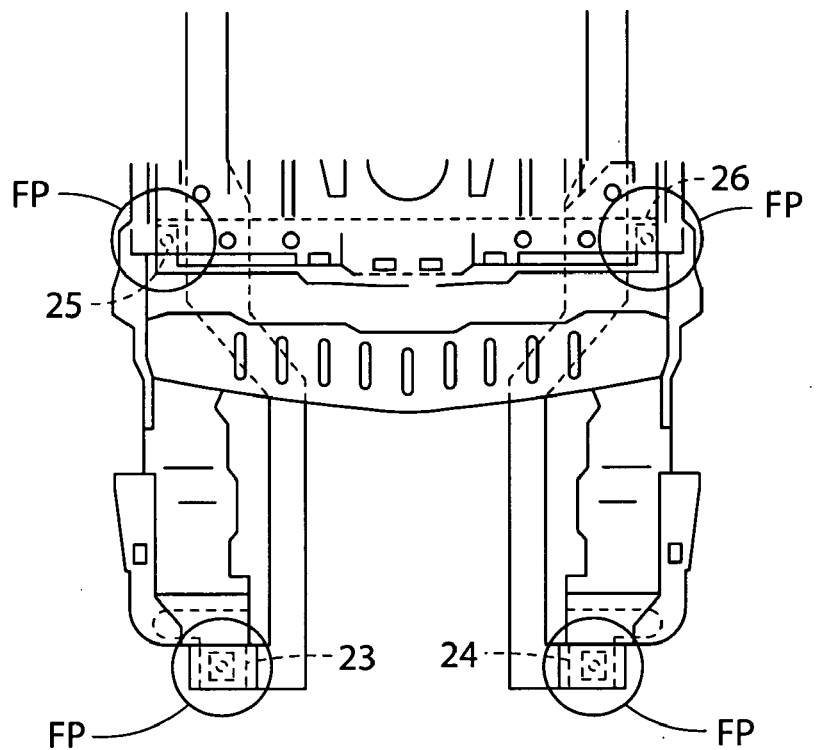
FIG. 7A is a schematic top plan view of the front end of the vehicle body illustrated in FIGS. 1–4 in accordance with the present invention, with a portion of the vehicle frame or chassis coupled to the vehicle body.
Figure 7B:
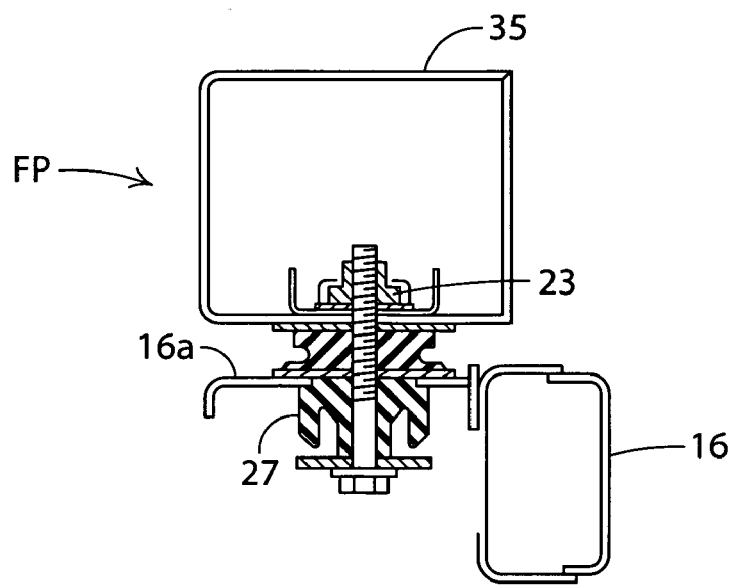
FIG. 7B is a front partial cross sectional view of the front vehicle frame attachment part in accordance with the present invention.
Figure 8:
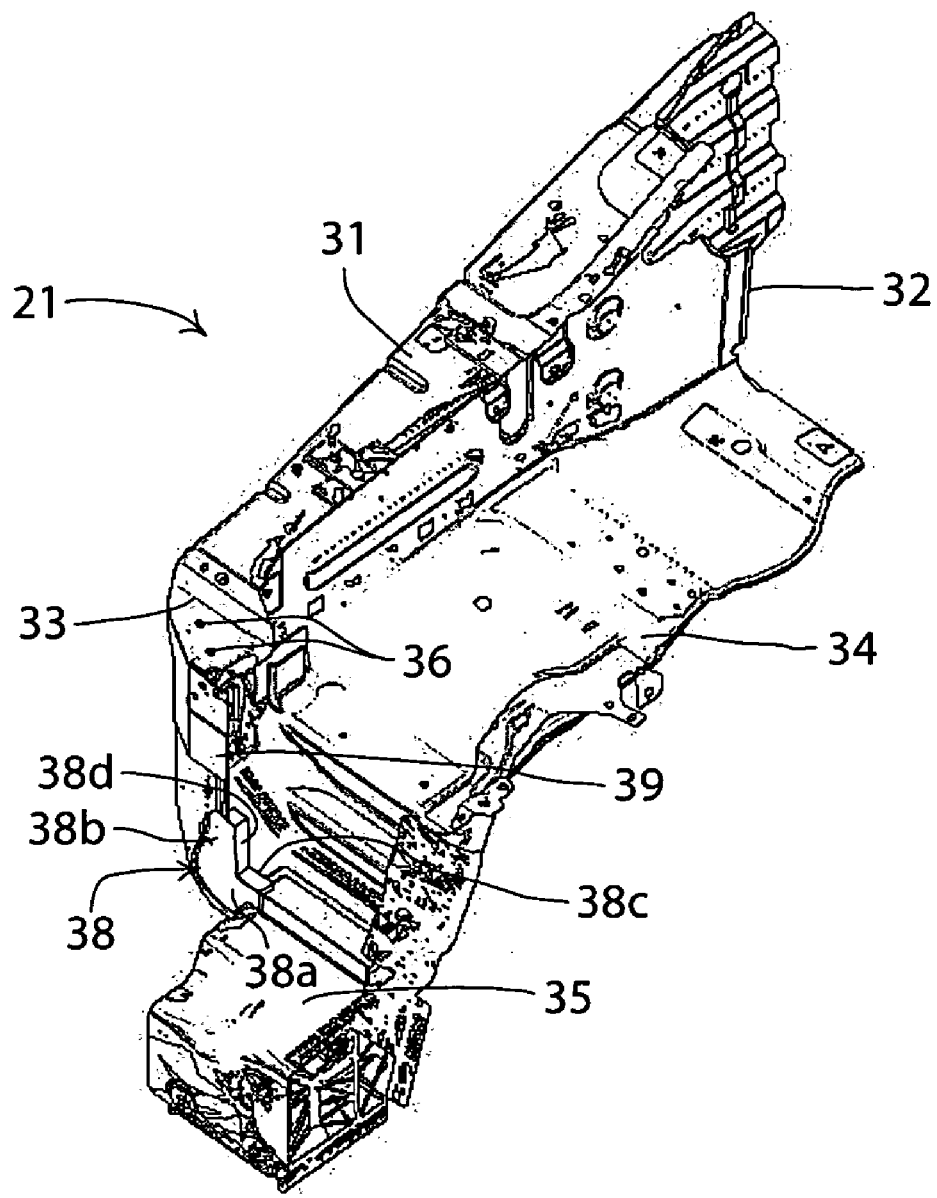
FIG. 8 is a front perspective view of the right hand side hood ledge for the vehicle body illustrated in FIGS. 1–4 in accordance with the present invention.

As seen in FIG. 7A, the vehicle body 12 also preferably includes a plurality of vehicle frame mounting parts 23, 24, 25 and 26 for coupling the vehicle body 12 to the frame 16. Preferably, a total of six vehicle frame mounting points FP are used in a full size pick up for the cab portion 18 including the hood ledge structures 21 and 22, while a total of ten vehicle frame mounting points FP are preferably used in a sport utility vehicle. The front end module 14 is not directly attached to the frame 16. Rather, as discussed below, the front end module 14 is directly attached to the hood ledge structures 21 and 22 at upper and lower front end module mounting points.

As best seen in FIGS. 5, 6, 7A and 7B, the hood ledge structures 21 and 22 are provided with the front vehicle frame mounting parts 23 and 24, respectively, for coupling their free ends to the vehicle chassis or frame 16, while the remainder of the cab portion 18 is attached to the vehicle chassis or frame 16 by the main front vehicle frame mounting parts 25 and 26 (only two of the four are illustrated in FIG. 7A). The vehicle frame mounting part 23–26 are preferably nuts that are secured to the bottom of the free ends of the hood ledge structures 21 and 22. The vehicle frame mounting part 23–26 are mounted to the mounting members 16a and 16b of the frame 16 via a plurality of conventional body mounting fixtures 27 (only one shown in FIG. 7B) that are configured and arranged to isolate the frame 16 from the vehicle body 12. Thus, the hood ledge structures 21 and 22 are supported in the vertical direction by the frame 16 via the mounting members 16a and 16b. In other words, the front end module 14 is solely coupled to the hood ledge structures 21 and 22 of the vehicle body 12 and is not directly coupled to the frame 16.

Referring now to FIGS. 8–13, the right hand side hood ledge structure 21 will now be discussed in more detail. The hood ledge structure 21 preferably has a generally tubular main body 31 having a rear end 32 and a front end 33. The main body 31 extends in a generally longitudinal direction of the vehicle 10. The rear end 32 of the hood ledge structure 21 is fixedly connected to the firewall structure 20, while the front end 33 is fixedly coupled to the frame member 16a of the frame 16. The rear end 32 forms a first rear end mounting section that is coupled to a first lateral end of the firewall structure 20, while the front end 33 forms a first front end mounting section that is coupled to the frame member 16a of the frame 16 via the vehicle frame mounting part 23.

The right hand side hood ledge structure 21 also includes a wheel well structure 34 extends laterally inwardly from the main body 31, and a front mounting structure 35 integrally formed with the front end 33 of the main body 31 and the wheel well structure 34. The front mounting structure 35 is offset inwardly from the main body 31 and projects forwardly from the front end 33 of the main body 31. This arrangement further assists in the mounting of the front end module 14 to the hood ledge structure 21.

Figure 9:
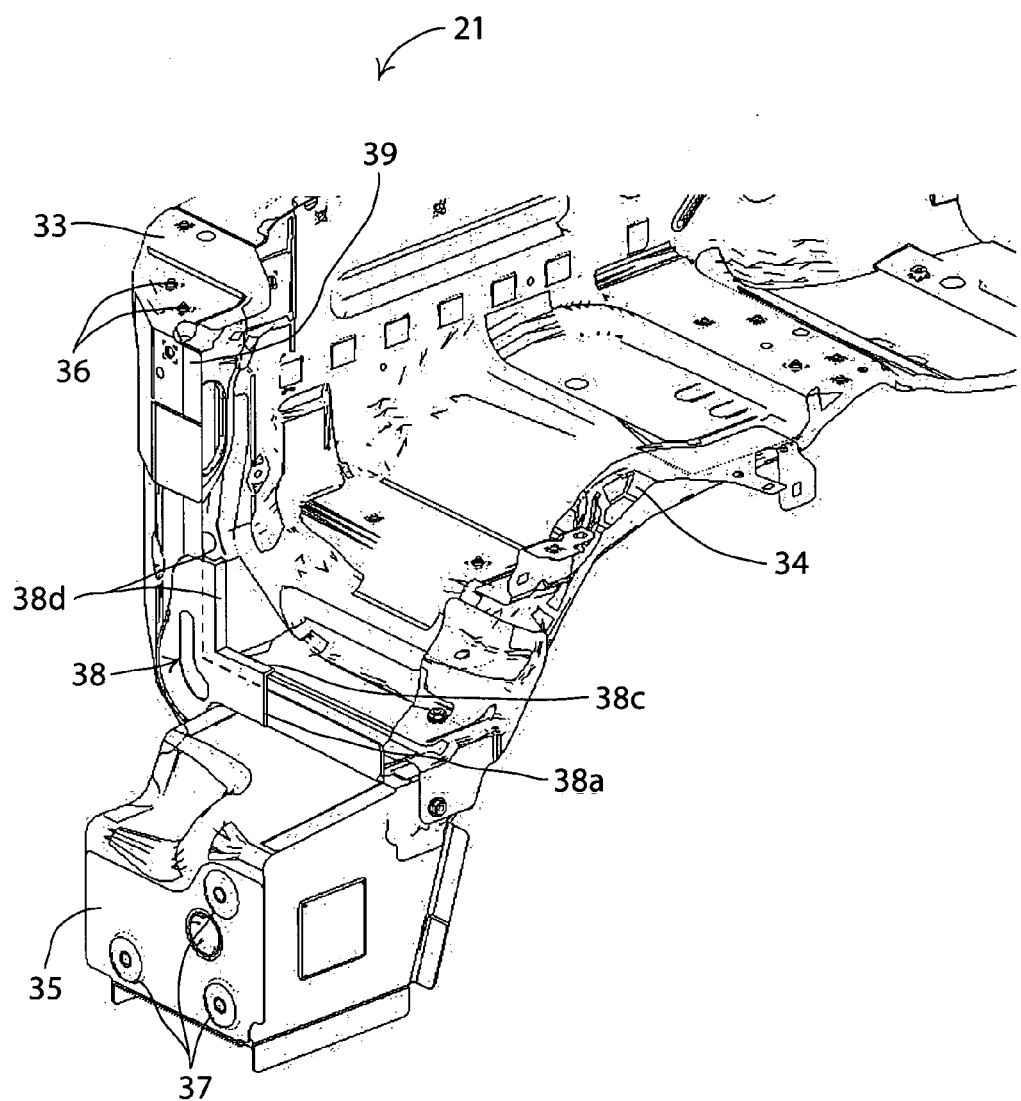
FIG. 9 is an enlarged partial perspective view of the right hand side hood ledge illustrated in FIG. 8 for the vehicle body illustrated in FIGS. 1–4 in accordance with the present invention.
Figure 10:
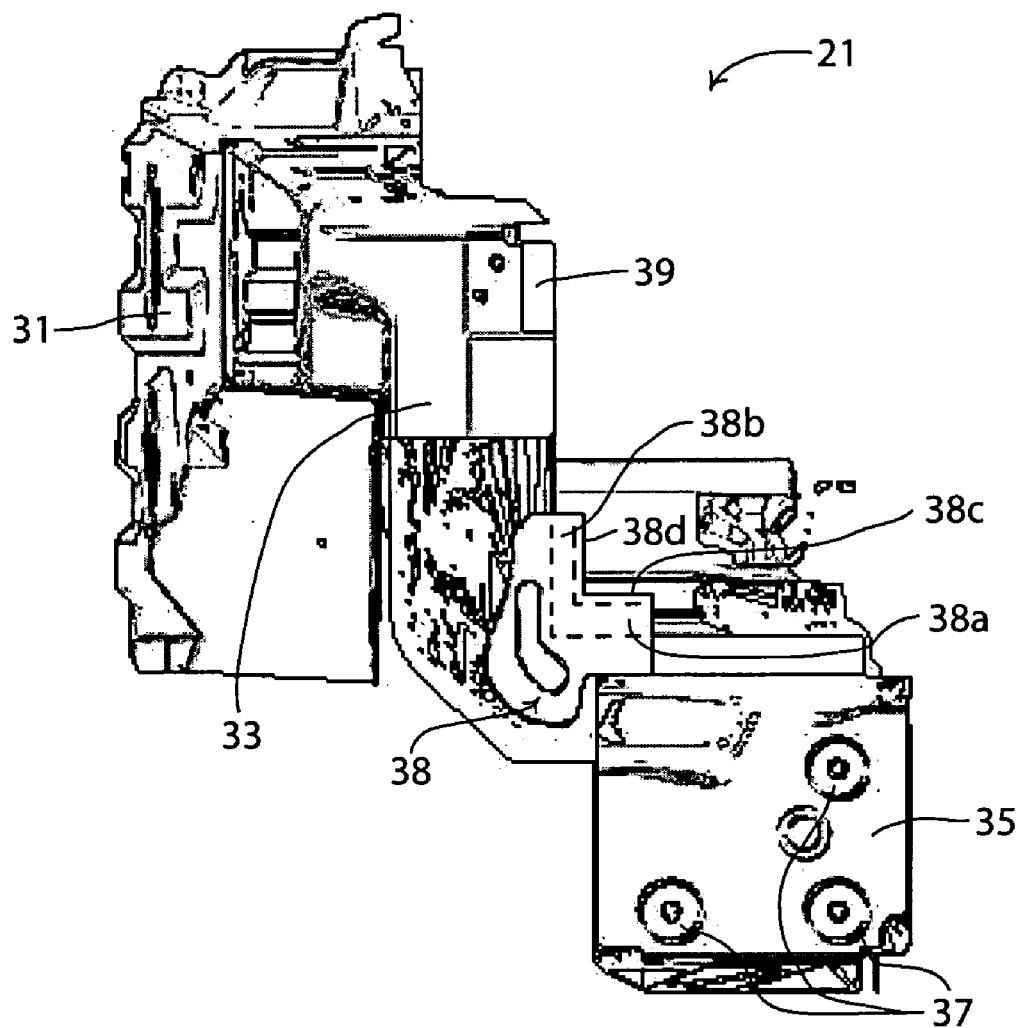
FIG. 10 is a front elevational view of the right hand side hood ledges illustrated in FIGS. 8 and 9 for the vehicle body illustrated in FIGS. 1–4 in accordance with the present invention.
Figure 11:
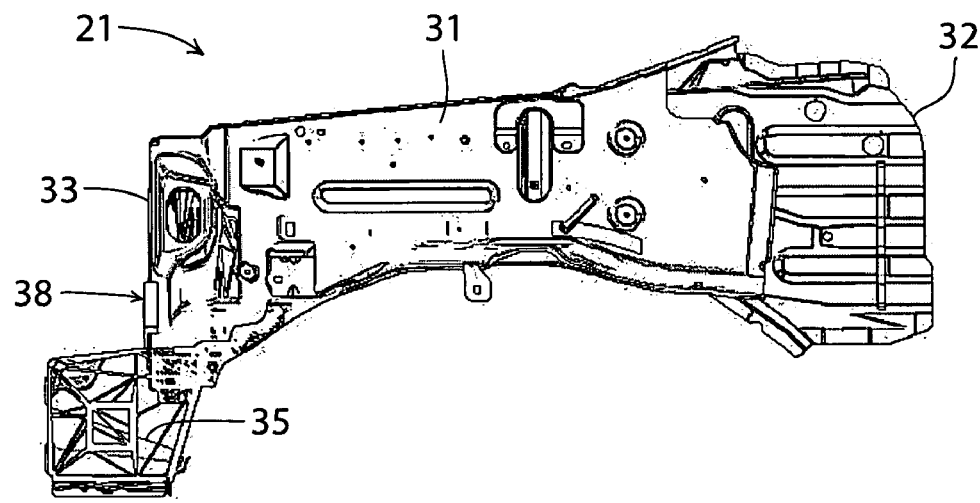
FIG. 11 is a left hand side or interior side elevational view of the right hand side hood ledge illustrated in FIGS. 8–10 for the vehicle body illustrated in FIGS. 1–4 in accordance with the present invention.
Figure 12:
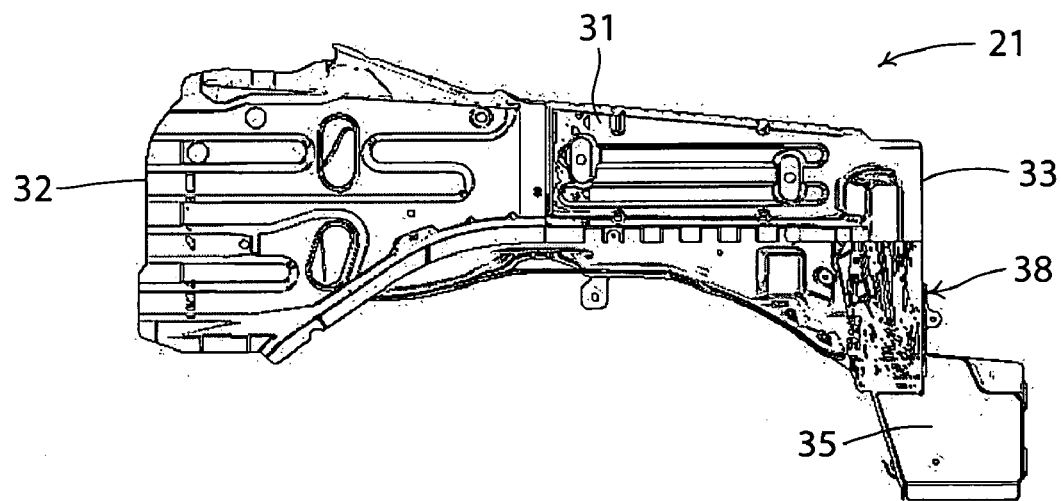
FIG. 12 is an exterior side or right hand side elevational view of the right hand side hood ledge illustrated in FIGS. 8–11 for the vehicle body illustrated in FIGS. 1–4 in accordance with the present invention.
Figure 13:
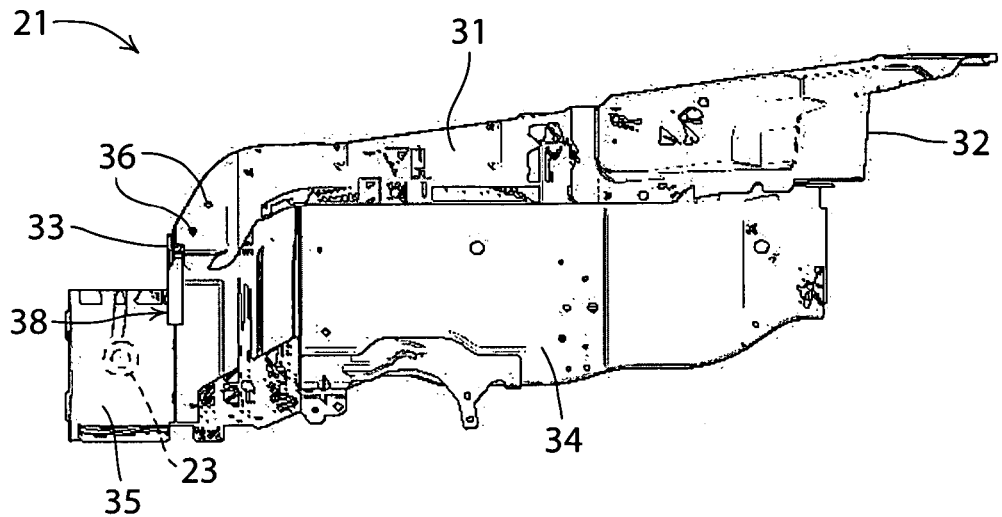
FIG. 13 is a top plan view of the right hand side hood ledge illustrated in FIGS. 6–12 for the vehicle body illustrated in FIGS. 1–4 in accordance with the present invention.
Figure 14:
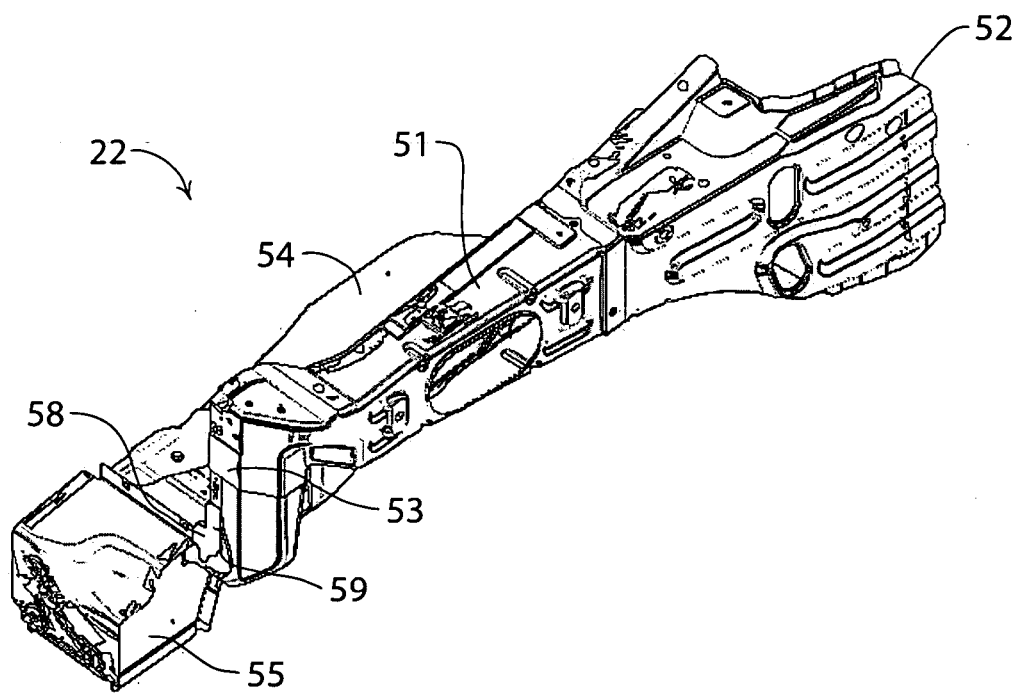
FIG. 14 is a front perspective view of the left hand side hood ledge for the vehicle body illustrated in FIGS. 1–4 in accordance with the present invention.

As particularly seen in FIG. 9, the upper surface of the front end 33 has a pair of threaded mounting holes 36 for securing a first upper portion of the front end module 14 thereto as discussed below. The forwardly facing surface of the front mounting structure 35 has three threaded mounting holes 37 for securing a second lower portion of the front end module 14 thereto as discussed below. Thus, the center axes of the mounting holes 36 are substantially perpendicular to the center axes of the mounting holes 37. In other words, the mounting holes 36 have center axes that extend in a substantially vertical direction, while the mounting holes 37 have center axes extending in a substantially horizontal direction. As best seen in FIG. 9, the mounting holes 36 are located laterally outwardly relative to the mounting holes 37. In other words, the mounting holes 37 are offset inwardly towards the center axis of the vehicle 10 relative to the mounting holes 36. Thus, the first front end mounting section of the hood ledge structure 21 had a first upper front end module attachment part formed by the mounting holes 36 and a first lower front end module attachment part formed by the mounting holes 37 for directly mounting the front end module 14 onto the vehicle body 12 by the hood ledge structure 21.

Also, an L-shaped guide member 38 is fixedly coupled to an L-shaped flange 39 of the hood ledge structure 21. The guide member 38 is formed of the sheet metal material and spot welded to the hood ledge structure 21. The guide member 38 projects outwardly from L-shaped flange 39 of the front end 33 of the main body 31 and the front mounting structure 35. Preferably, the guide member 38 is attached at the corner of where the front end 33 of the main body 31 and the front mounting structure 35 meet for adding strength. In particular, the guide member 38 has a first side horizontal flange or guide portion 38a and a first side vertical flange or guide portion 38b. The horizontal guide portion 38a is disposed along an upwardly facing wall of the front mounting structure 35 of the main body 31. The vertical guide portion 38b is disposed along an inwardly facing side wall of the front end 33 of the main body 31.

Accordingly, the horizontal guide portion 38a has an L-shaped cross section with a vertical part attached to the hood ledge structure 21 and a horizontal part spaced outwardly from the hood ledge structure 21. The horizontal part of the horizontal guide portion 38a is a flange like member that has an upper horizontal planar guide surface 38c. The vertical guide portion 38b has a free vertical edge that forms a vertical planar guide surface 38d. The vertical guide portion 38b has an L-shaped cross section with a first lateral part attached to the hood ledge structure 21 and a second front to aft part spaced outwardly from the hood ledge structure 21. The second front to aft part of the vertical guide portion 38b is a flange like member that has an inwardly facing vertical planar guide surface 38d.

The guide surfaces 38c and 38d are preferably perpendicularly arranged and spaced outwardly from the front mounting structure 35 and the front end 33 of the main body 31, respectively. Since the guide portions 38a and 38b extend outwardly from the hood ledge structure 21, the guide portions 38a and 38b act as guides to prevent the front end module 14 from being damaged or scratched during installation. In other words, the guide surfaces 38c and 38d contact the front end module 14 to provide a clearance between the remaining structure of the hood ledge structure 21 and the front end module 14.

Referring now to the FIGS. 14–19, the left hand side hood ledge structure 22 is for all practical purposes a mirror image of the hood ledge structure 21. In other words, the hood ledge structures 21 and 22 are substantially identical for the purposes of the present invention, except for that they are mirror images of each other. Basically, the left hand side hood ledge structure 22 has a main body portion 51 with a rear end portion 52 and a front end portion 53. The main body 51 extends in a generally longitudinal direction of the vehicle 10. The rear end 52 of the hood ledge structure 22 is fixedly connected to the firewall structure 20, while the front end 53 is fixedly coupled to the frame member 16b of the frame 16. The rear end 52 forms a second rear end mounting section that is coupled to a second lateral end of the firewall structure 20, while the front end 53 forms a second front end mounting section that is coupled to the frame member 16a of the frame 16 via the vehicle frame mounting part 24.

The hood ledge structure 22 also includes a wheel well structure 54, which extends laterally inwardly from the main body 51, and a front mounting structure 55 integrally formed with the front end 53 of the main body 51 and the wheel well structure 54. The front mounting structure 55 is offset inwardly from the main body 51 and projects forwardly from the front end 53 of the main body 51. This arrangement further assists in the mounting of the front end module 14 to the hood ledge structure 22.

Figure 15:
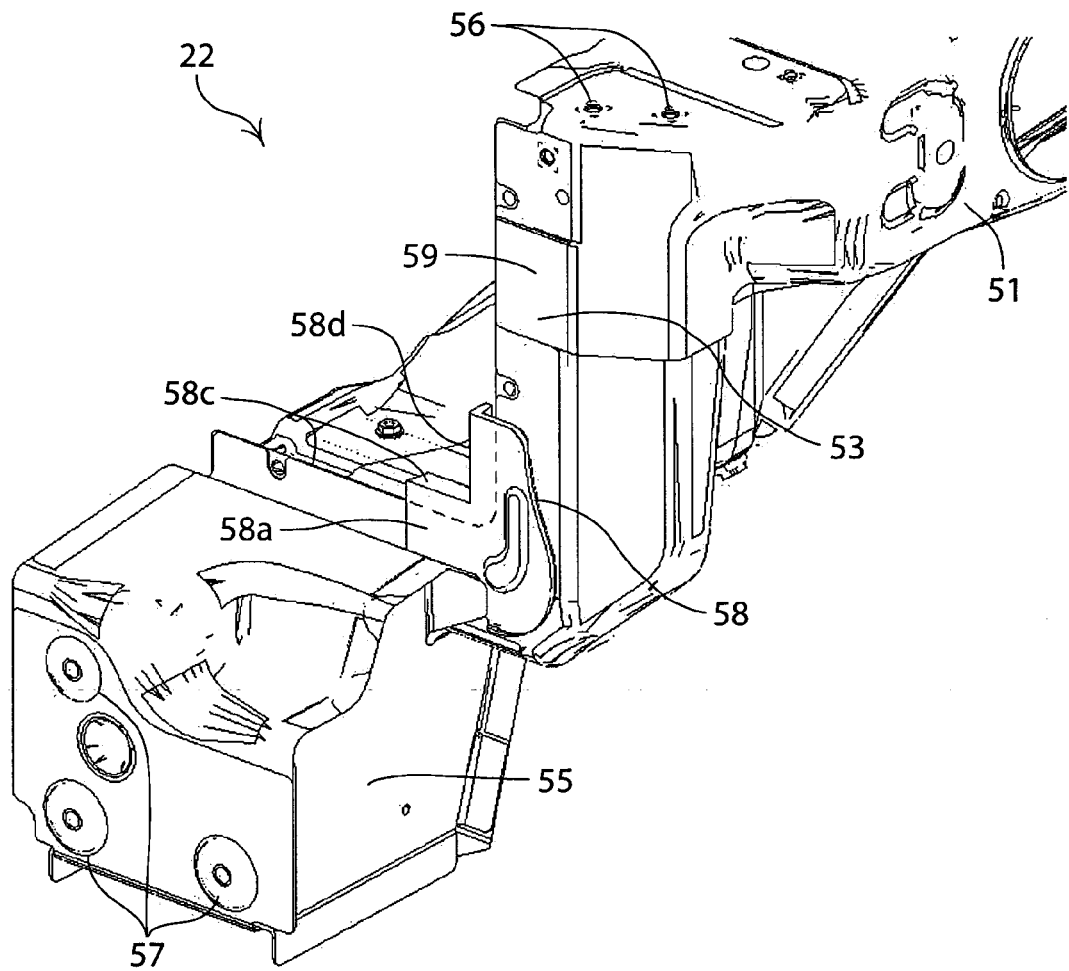
FIG. 15 is an enlarged partial front perspective view of the left hand side hood ledge illustrated in FIG. 14 for the vehicle body illustrated in FIGS. 1–4 in accordance with the present invention.
Figure 16:
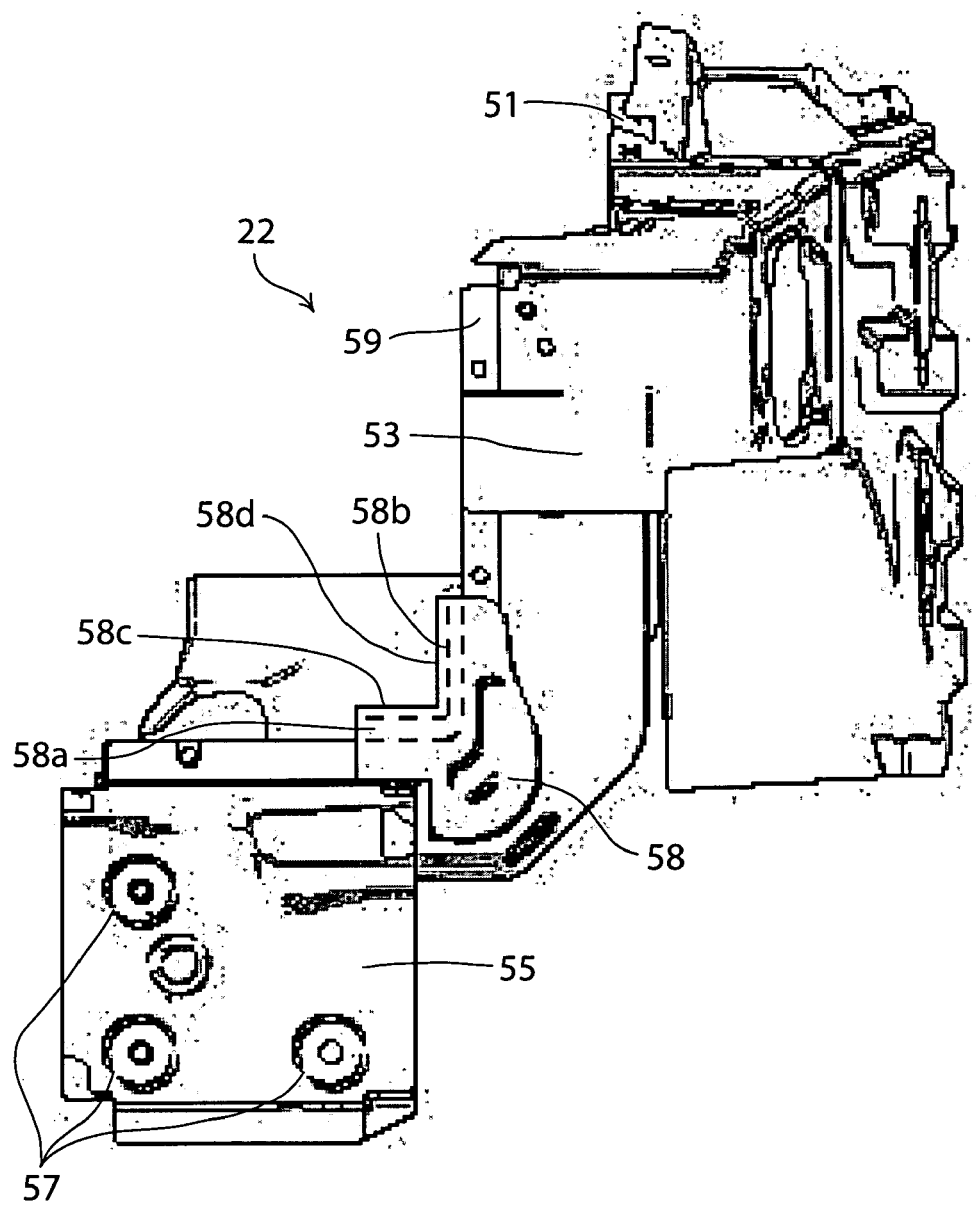
FIG. 16 is a front elevational view of the left hand side hood ledge illustrated in FIGS. 14 and 15 for the vehicle body illustrated in FIGS. 1–4 in accordance with the present invention.
Figure 17:
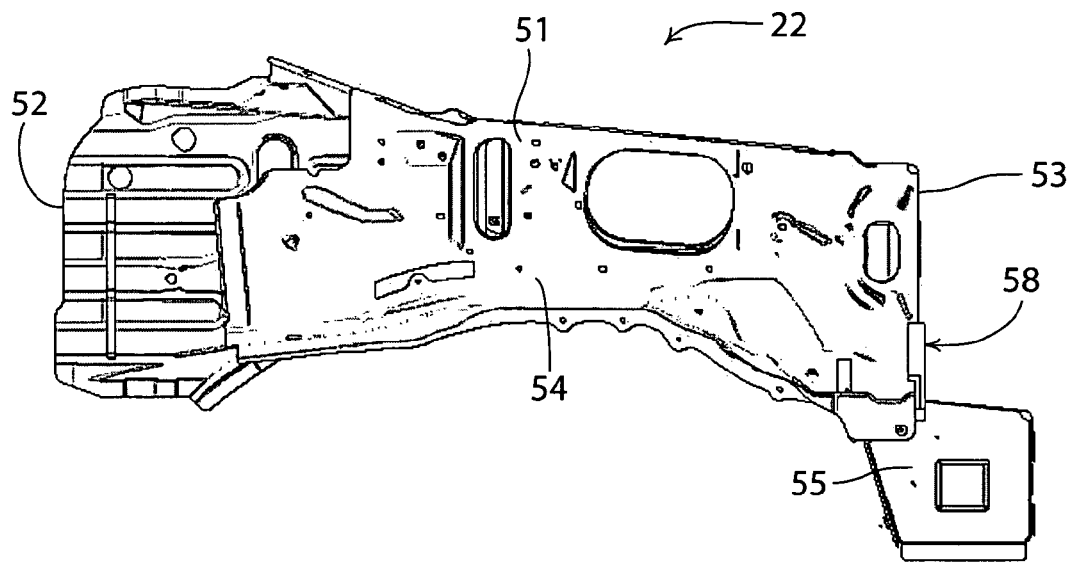
FIG. 17 is a right hand side or interior side elevational view of the left hand side hood ledge illustrated in FIGS. 14–16 for the vehicle body illustrated in FIGS. 1–4 in accordance with the present invention.
Figure 18:
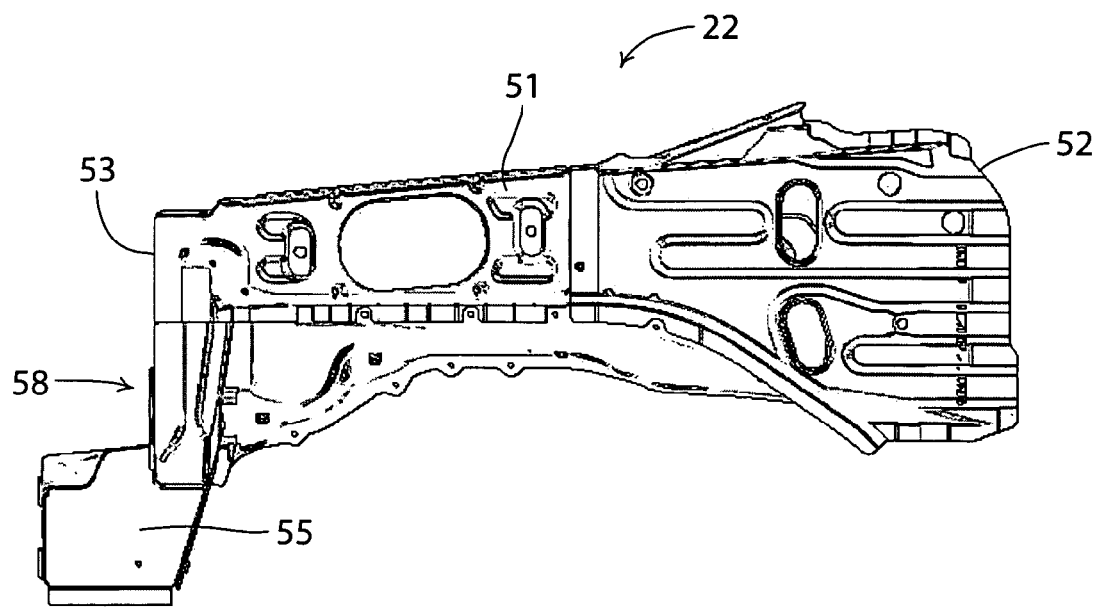
FIG. 18 is a left hand side or exterior side elevational view of the left hand side hood ledge illustrated in FIGS. 14–17 for the vehicle body illustrated in FIGS. 1–4 in accordance with the present invention.
Figure 19:
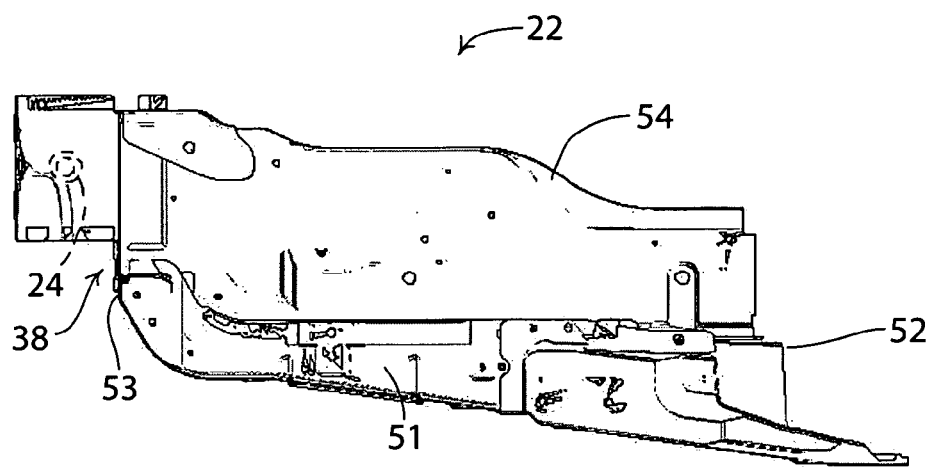
FIG. 19 is a top plan view of the left hand side hood ledge for the vehicle body illustrated in FIGS. 1–4 in accordance with the present invention.

As particularly seen in FIG. 15, the upper surface of the front end 53 has a pair of threaded mounting holes 56 for securing a first upper portion of the front end module 14 thereto as discussed below. The forwardly facing surface of the front mounting structure 55 has three threaded mounting holes 57 for securing a second lower portion of the front end module 14 thereto as discussed below. Thus, the center axes of the mounting holes 56 are substantially perpendicular to the center axes of the mounting holes 57. In other words, the mounting holes 56 have center axes that extend in a substantially vertical direction, while the mounting holes 57 have center axes extending in a substantially horizontal direction. As best seen in FIG. 15, the mounting holes 56 are located laterally outwardly relative to the mounting holes 57. In other words, the mounting holes 57 are offset inwardly towards the center axis of the vehicle 10 relative to the mounting holes 56. Thus, the second front end mounting section of the hood ledge structure 22 had a second upper front end module attachment part formed by the mounting holes 56 and a second lower front end module attachment part formed by the mounting holes 57 for directly mounting the front end module 14 onto the vehicle body 12 by the hood ledge structure 22.

Also, an L-shaped guide member 58 is fixedly coupled to an L-shaped flange 59 of the hood ledge structure 22. The guide member 58 is formed of the sheet metal material and spot welded to the hood ledge structure 22. The guide member 58 projects outwardly from L-shaped flange 59 of the front end 53 of the main body 51 and the front mounting structure 55. Preferably, the guide member 58 is attached at the corner of where the front end 53 of the main body 51 and the front mounting structure 55 meet for adding strength. In particular, the guide member 58 has a second side horizontal flange or guide portion 58a and a second side vertical flange or guide portion 58b. The horizontal guide portion 58a is disposed along an upwardly facing wall of front mounting structure 55 of the main body 51. The vertical guide portion 58b is disposed along an inwardly facing side wall of the front end 53 of the main body 51.

Accordingly, the horizontal guide portion 58a has an L-shaped cross section with a vertical part attached to the hood ledge structure 22 and a horizontal part spaced outwardly from the hood ledge structure 22. The horizontal part of the horizontal guide portion 58a is a flange like member that has an upper horizontal planar guide surface 58c. The vertical guide portion 58b has a free vertical edge that forms a vertical planar guide surface 58d. The vertical guide portion 35b has an L-shaped cross section with a first lateral part attached to the hood ledge structure 22 and a second front to aft part spaced outwardly from the hood ledge structure 22. The second front to aft part of the vertical guide portion 58b is a flange like member that has an inwardly facing vertical planar guide surface 58c. The guide surfaces 58c and 58d are preferably perpendicularly arranged and spaced outwardly from the front mounting structure 55 and the front end 53 of the main body 51, respectively. Since the guide portions 58a and 58b extend outwardly from the hood ledge structure 22, the guide portions 58a and 58b act as guides to prevent the front end module 14 from being damaged or scratched during installation. In other words, the guide surfaces 58c and 58d contact the front end module 14 to provide a clearance between the remaining structure of the hood ledge structure 22 and the front end module 14.

The horizontal planar guide surfaces 38c and 58c preferably lie in a single horizontal plane that acts as a support surface for the front end module 14, while the vertical planar guide surfaces 38d and 58d constrain the front end module from moving side to side. In other words, when the front end module 14 is being installed, the front end module 14 can initially rest on the horizontal planar guide surfaces 38c and 58c until the front end module 14 is correctly position. The vertical planar guide surfaces 38d and 58d ensures side to side alignment. Preferably, when the front end module 14 is fastened to the hood ledge structures 21 and 22, a small clearance of about 5 millimeters is formed between the front end module 14 and the guide surfaces 38c, 38d, 58c and 58d.

Figure 26:
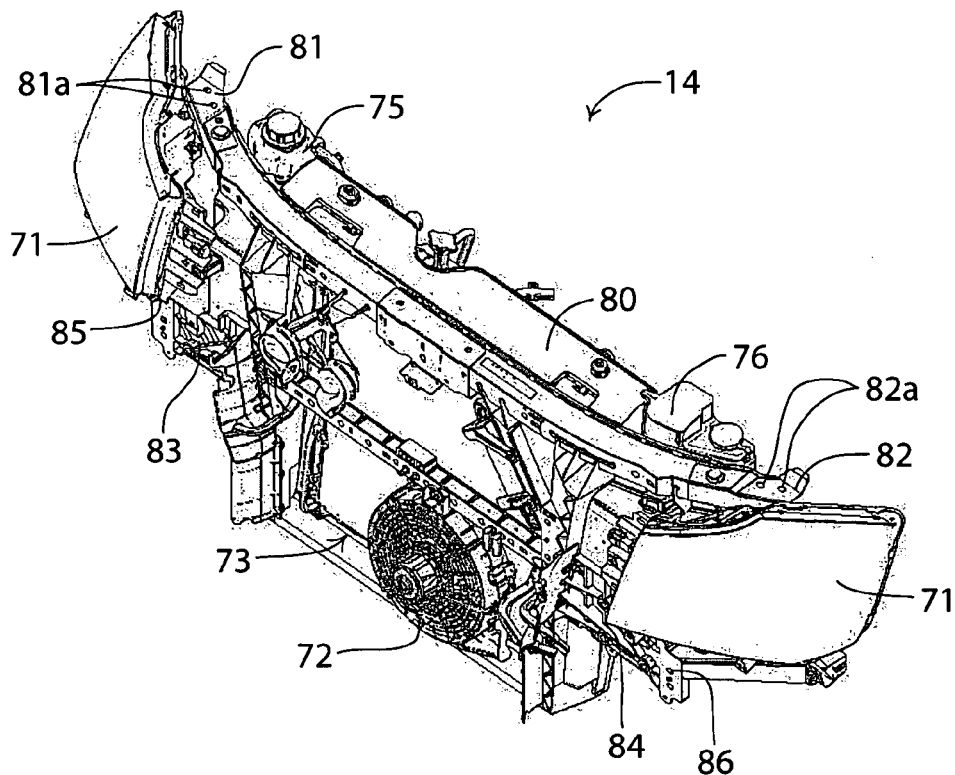
FIG. 26 is a front perspective view of the front end module for the vehicle body illustrated in FIGS. 1–4 in accordance with the present invention.
Figure 27:
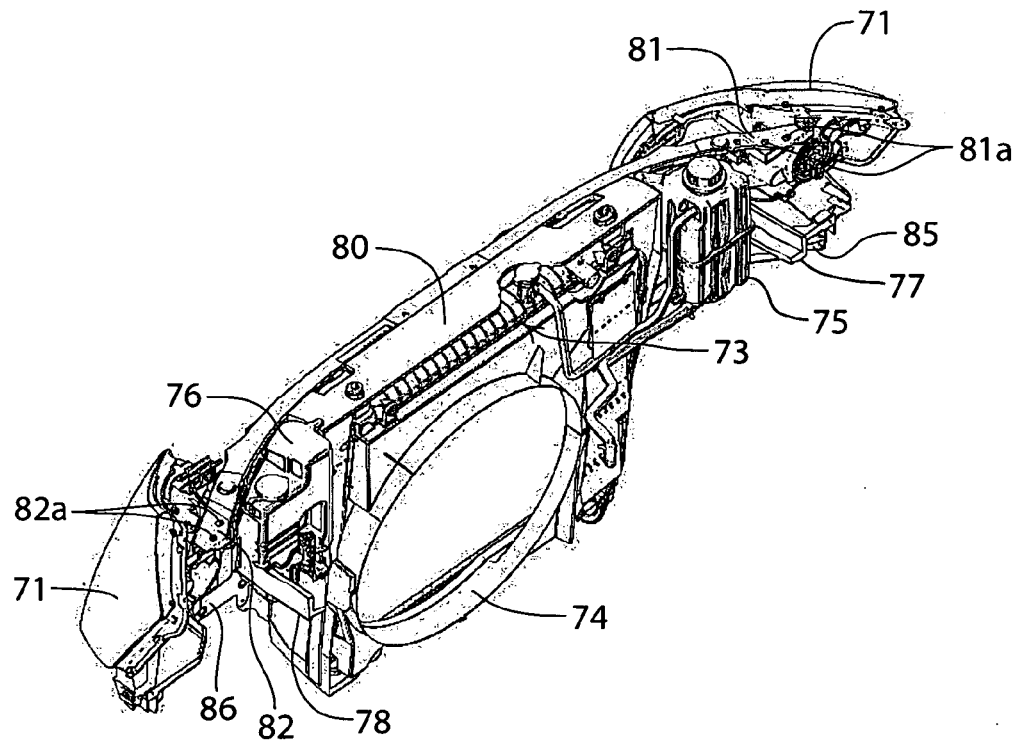
FIG. 27 is a rear perspective view of the front end module illustrated in FIG. 26 for the vehicle body illustrated in FIGS. 1–4 in accordance with the present invention.
Figure 28:
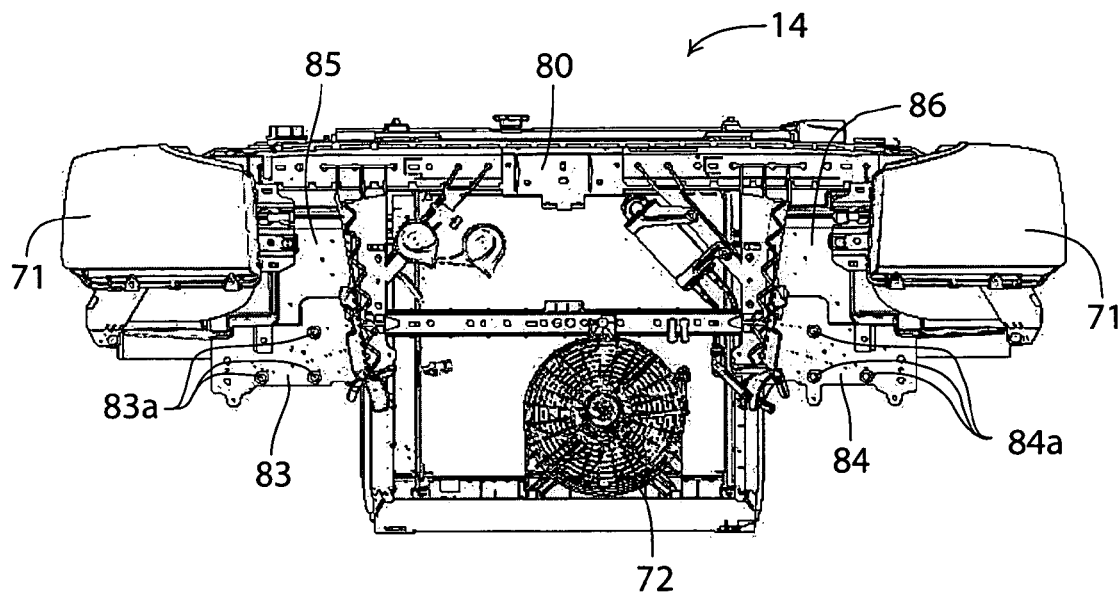
FIG. 28 is a front elevational view of the front end module illustrated in FIGS. 26 and 27 for the vehicle body illustrated in FIGS. 1–4 in accordance with the present invention.
Figure 29:
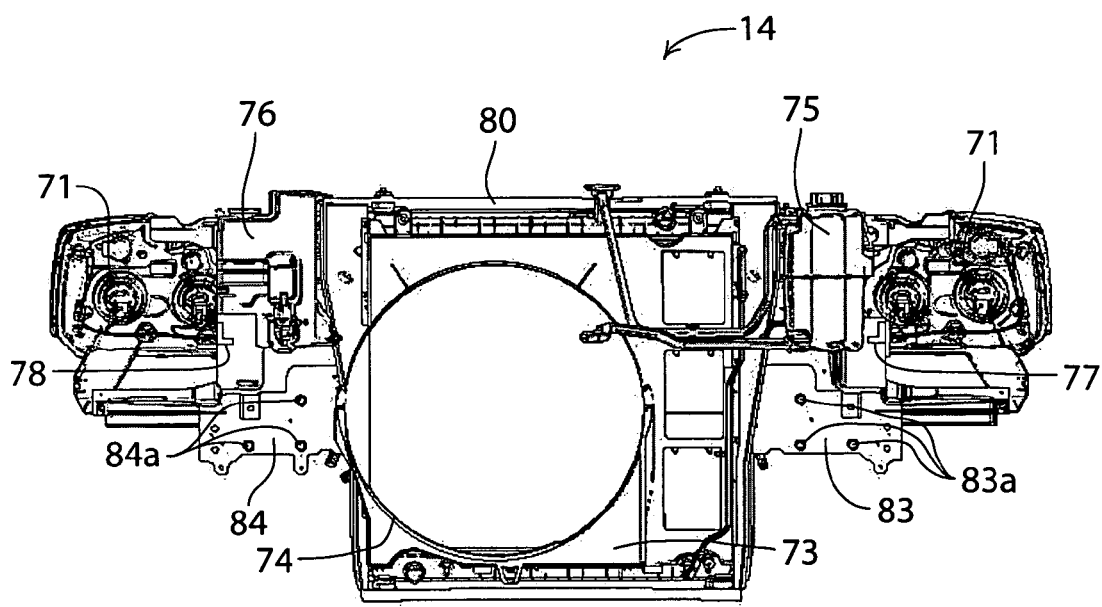
FIG. 29 is a rear elevational view of the front end module illustrated in FIGS. 26–28 for the vehicle body illustrated in FIGS. 1–4 in accordance with the present invention.
Figure 30:
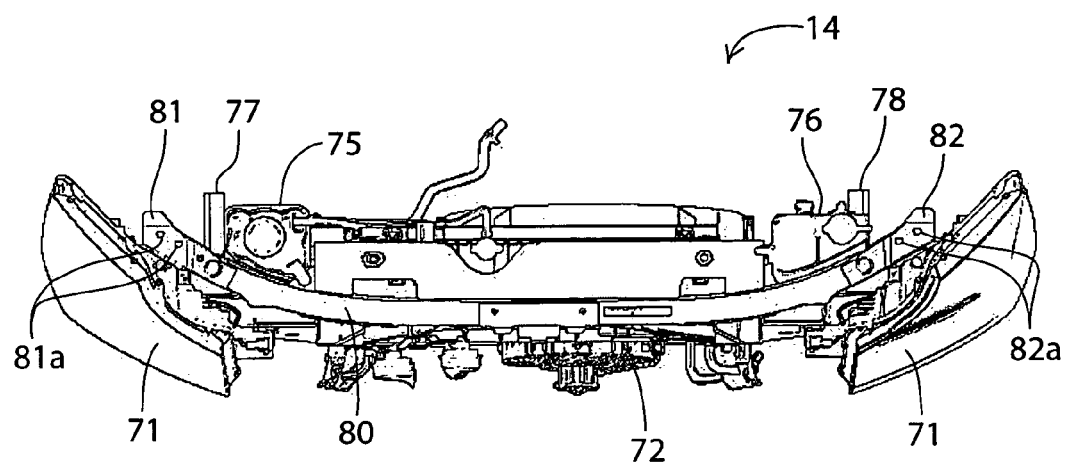
FIG. 30 is a top plan view of the front end module illustrated in FIGS. 26–29 for the vehicle body illustrated in FIGS. 1–4 in accordance with the present invention.
Figure 31:
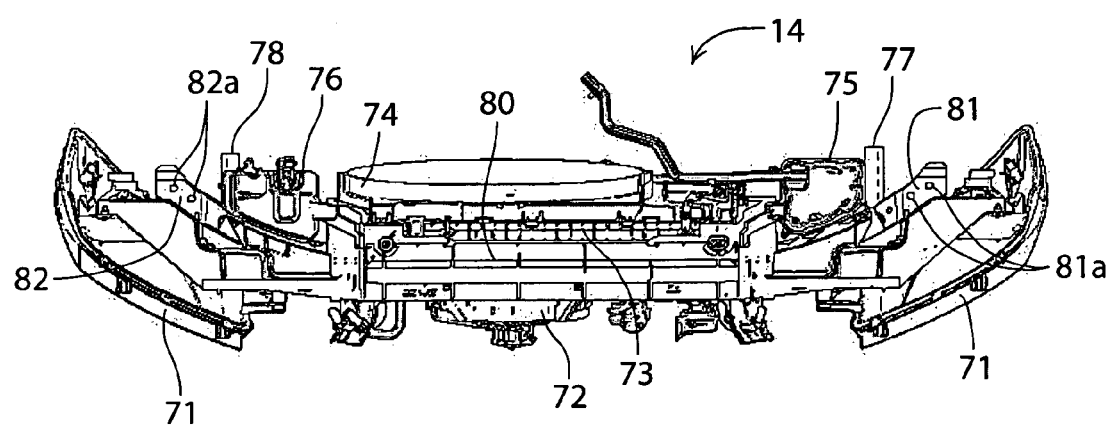
FIG. 31 is a bottom plan view of the front end module illustrated in FIGS. 26–30 for the vehicle body illustrated in FIGS. 1–4 in accordance with the present invention.
Figure 32:
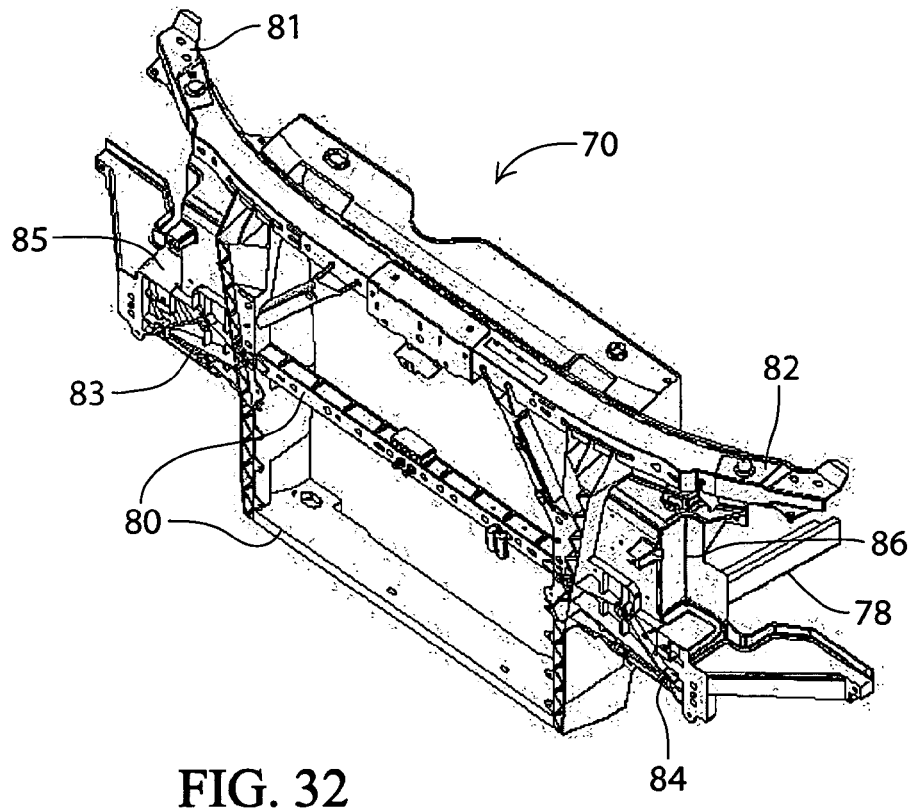
FIG. 32 is a front perspective view of the frame structure or bolster of the front end module illustrated in FIGS. 1–4 in accordance with the present invention.
Figure 33:
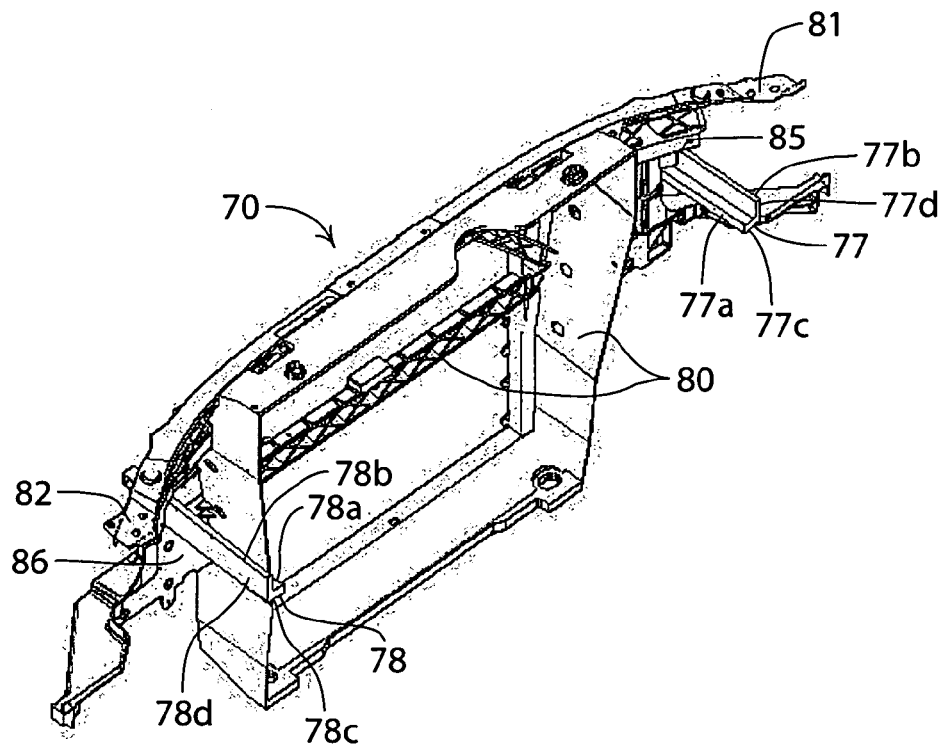
FIG. 33 is a rear perspective view of the frame structure or bolster illustrated in FIG. 32 for the front end module illustrated in FIGS. 1–4 in accordance with the present invention.
Figure 34:
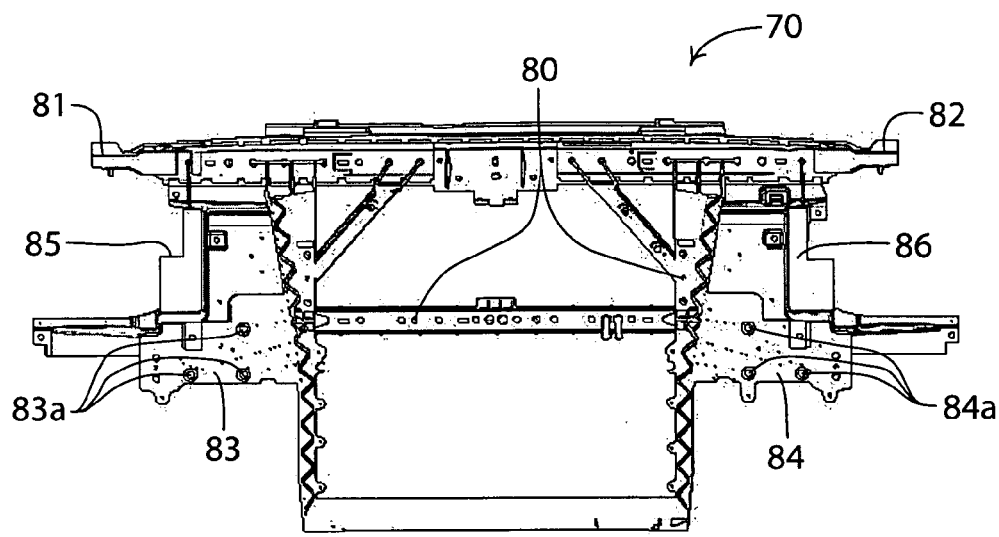
FIG. 34 is a front elevational view of the frame structure or bolster illustrated in FIGS. 32 and 33 for the front end module illustrated in FIGS. 1–4 in accordance with the present invention.
Figure 35:
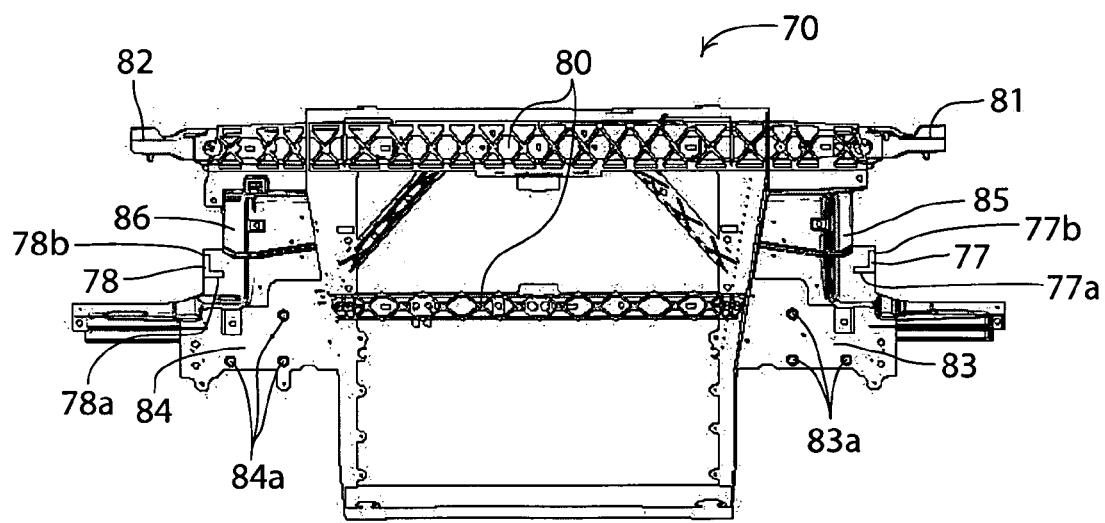
FIG. 35 is a rear elevational view of the frame structure or bolster illustrated in FIGS. 32–34 for the front end module illustrated in FIGS. 1–4.
Figure 36:
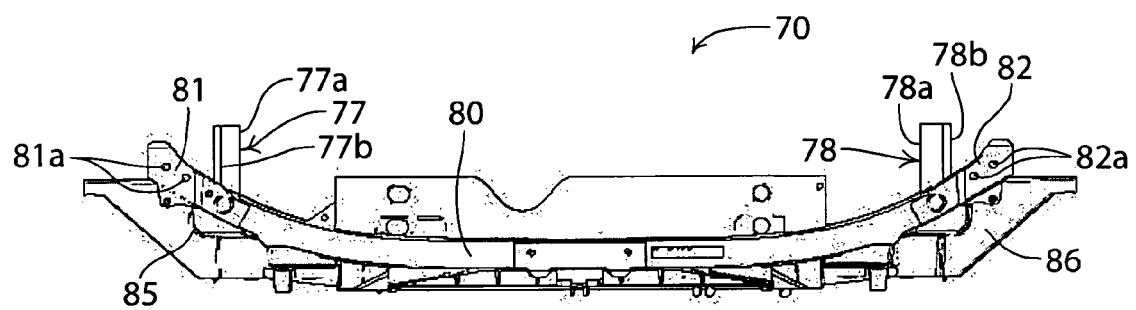
FIG. 36 is a top plan view of the frame structure or bolster illustrated in FIGS. 32–35 for the front end module illustrated in FIGS. 1–4 in accordance with the present invention.
Figure 37:
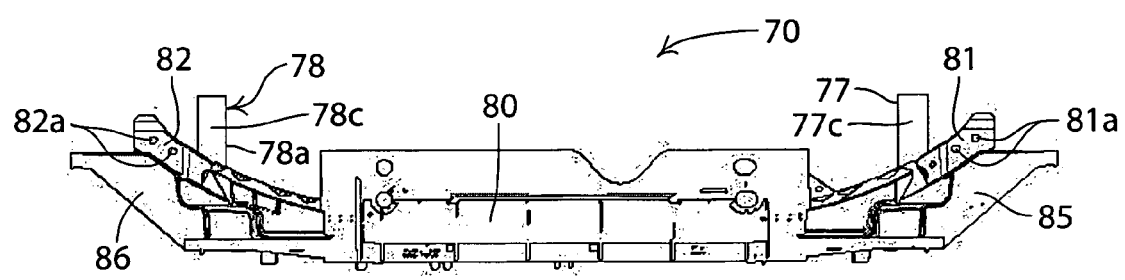
FIG. 37 is a bottom plan view of the frame structure or bolster illustrated in FIGS. 32–36 for the front end module illustrated in FIGS. 1–4 in accordance with the present invention.

Referring to FIGS. 2–4 and 26–31, the front end module 14 is a modularized unit that formed the front end of the vehicle 10. The front end module 14 includes a plurality of vehicle components coupled thereto so as to form a modularized unit that can be attached as a single unit to the hood ledge structures 21 and 22. The front end module 14 basically comprises a frame structure or bolster 70 with a plurality of vehicle components coupled thereto, such as a pair of headlights 71, a fan 72, a radiator 73, a radiator shroud 74, a coolant overflow tank 75 and a windshield wiper fluid tank 76 are preferably fixedly coupled to the frame structure 70, as best seen in FIGS. 26 and 27. These parts are assembled to the frame structure 70 to form a modular unit that is then installed on the hood ledge structures 21 and 22 of the vehicle body 12. However, these modular parts are not limited to those described above but can include other parts as well as some of the parts described above can be deleted from the front end modular 14.

The frame structure or bolster 70 is the front end module support structure. The frame structure or bolster 70 is provided with a pair of guide members or projection members 77 and 78. The first and second projection members 77 and 78 have L-shaped transverse cross sections that are configured and arranged to mate with the guide members 38 and 58 of the hood ledge structures 21 and 22. The first and second projection members 77 and 78 are preferably identical to each other, except that they are mirror images.

The first projection member 77 has a first side horizontal guide portion 77a and a first side vertical guide portion 77b. The side horizontal guide portion 77a includes a first horizontal planar surface 77c oriented in a horizontal direction from the frame structure or bolster 70, while the first side vertical guide portion 77b includes a first vertical planar surface 77d oriented in a vertical direction from the frame structure or bolster 70.

The second projection member 78 has a second side horizontal guide portion 78a and a second side vertical guide portion 78b. The second horizontal guide portion 78a includes a second horizontal planar surface 78c oriented in a horizontal direction from the frame structure or bolster 70, while the second side vertical guide portion 78b includes a second vertical planar surface 78d oriented in a vertical direction from the frame structure or bolster 70.

The horizontal planar surfaces 77c and 78c are configured and arranged to contact the horizontal planar guide surfaces 38c and 58c of the hood ledge structures 21 and 22 to aid in the vertical alignment of the front end module 14 relative to the vehicle body 12. The vertical planar surfaces 77d and 78d are configured and arranged to contact the vertical planar guide surfaces 38d and 58d of the hood ledge structures 21 and 22 to aid in the horizontal alignment of the front end module 14 relative to the vehicle body 12. Preferably, when the front end module 14 is installed on the hood ledge structures 21 and 22, a small clearance of about five millimeters exists between the horizontal planar surfaces 77c and 78c and the horizontal planar guide surfaces 38c and 58c. Likewise, when the front end module 14 is installed on the hood ledge structures 21 and 22, a small clearance of about five millimeters exists between vertical planar surfaces 77d and 78d are configured and arranged to contact the vertical planar guide surfaces 38d and 58d.

As seen in FIGS. 26–37, the frame structure 70 preferably includes a center radiator support portion 80, an upper right hand side mounting member 81, an upper left side mounting member 82, a lower right hand side mounting structure 83 and a lower left hand side mounting structure 84. The upper and lower right hand side mounting members 81 and 83 form a first side mounting portion located at a first lateral end of the support portion 80. The upper and lower left hand side mounting members 82 and 84 form a second side mounting portion located at a second lateral end of the support portion 80. The radiator support 80 is preferably constructed of a synthetic resin such as polypropylene containing glass fibers. Thus, the radiator support 80 is a substantially hard rigid member constructed as a single unitary member formed by hot pressing. Preferably, the radiator support 80 has a right hand side accessory support structure 85 and a left hand side accessory support structure 86 that is integrally formed as a one-piece unitary member with the radiator support 80. The accessory support structures 85 and 86 are configured and arranged for supporting the headlamps 71 and tanks 75 and 76 as well as other components as needed or desired.

Figure 20:
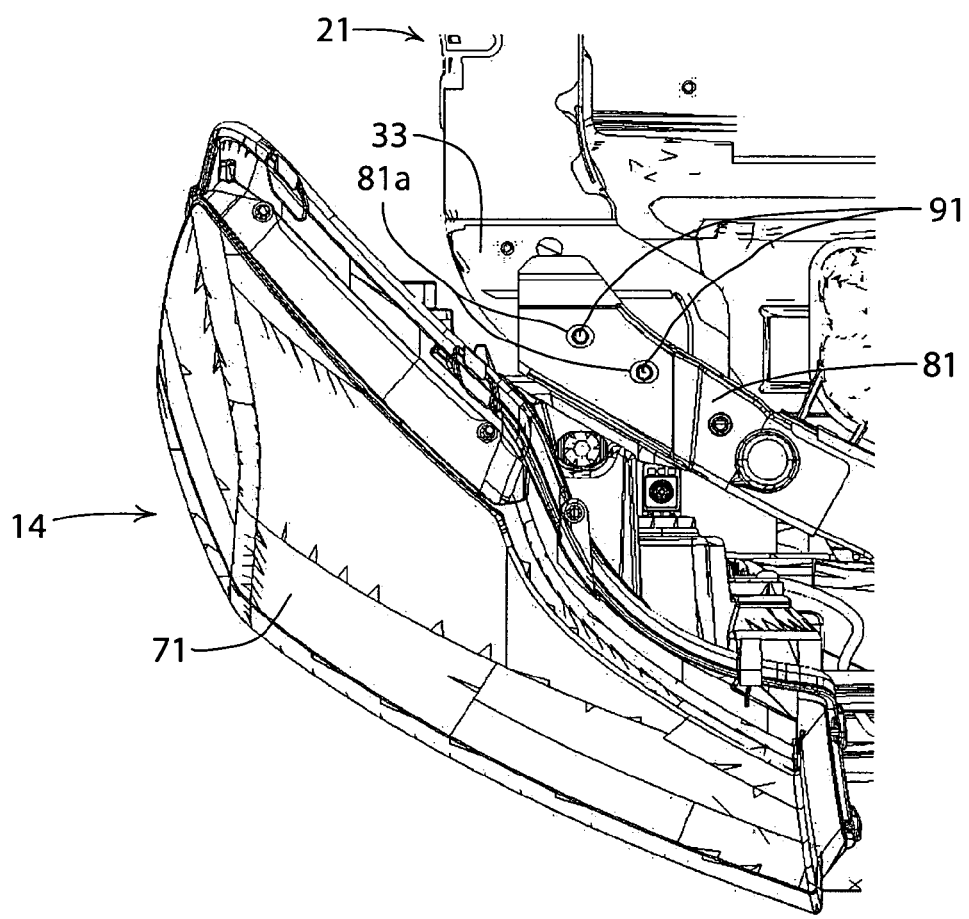
FIG. 20 is a partial top plan view of the right hand side hood ledge coupled to the right hand side of the front end module in accordance with the present invention.
Figure 21:
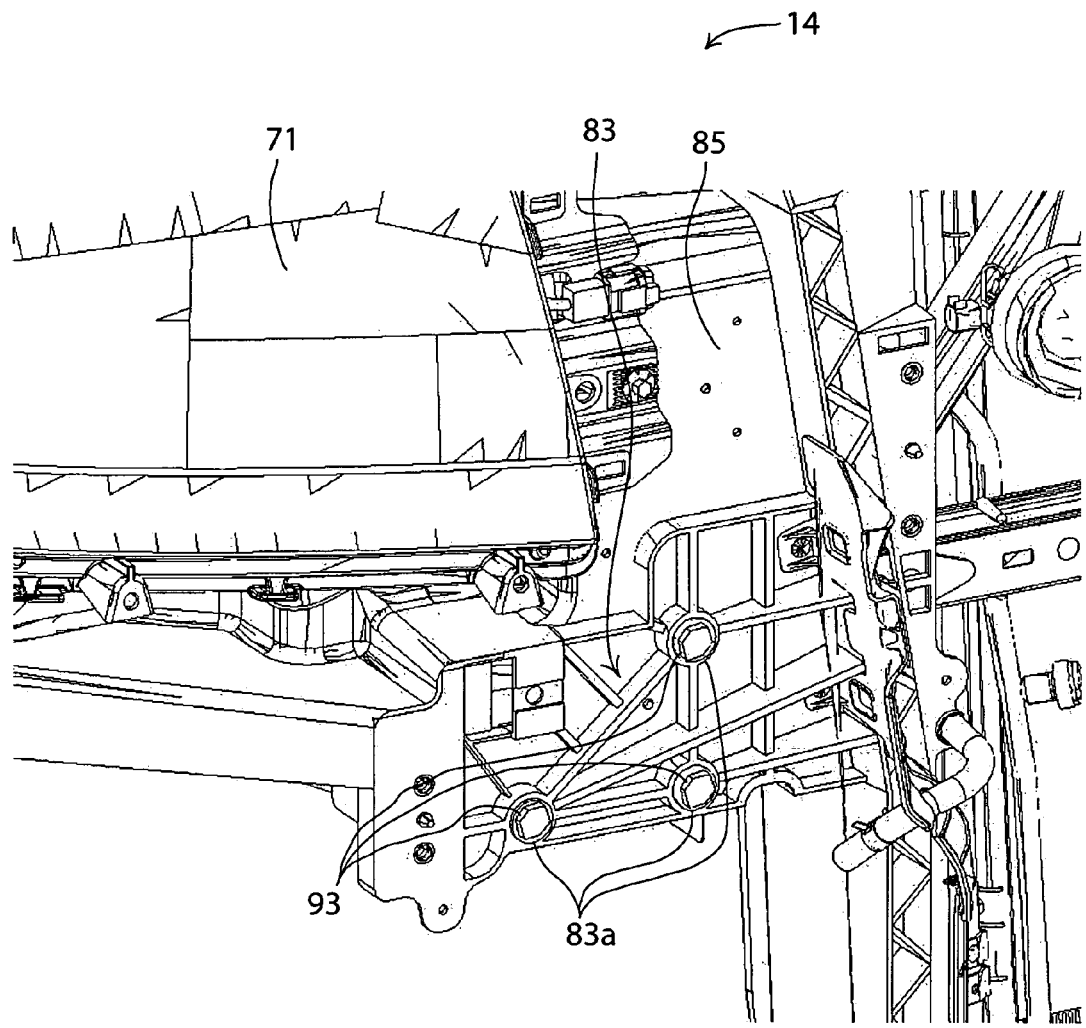
FIG. 21 is a partial front end perspective view of the lower right hand side mounting portion of the front end module.
Figure 22:
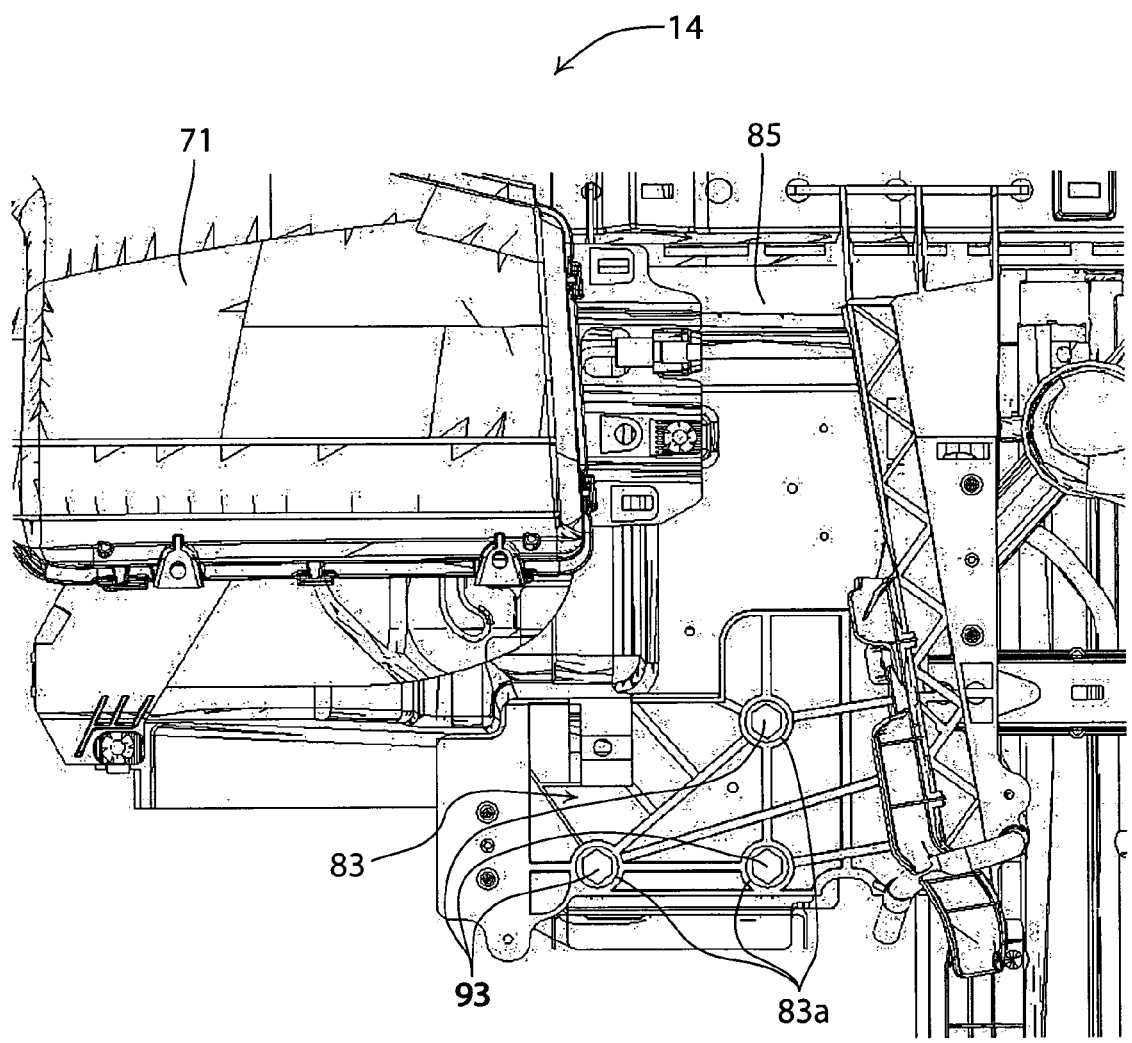
FIG. 22 is a partial front elevational view of the lower right hand side mounting portion of the front end module in accordance with the present invention.
Figure 23:
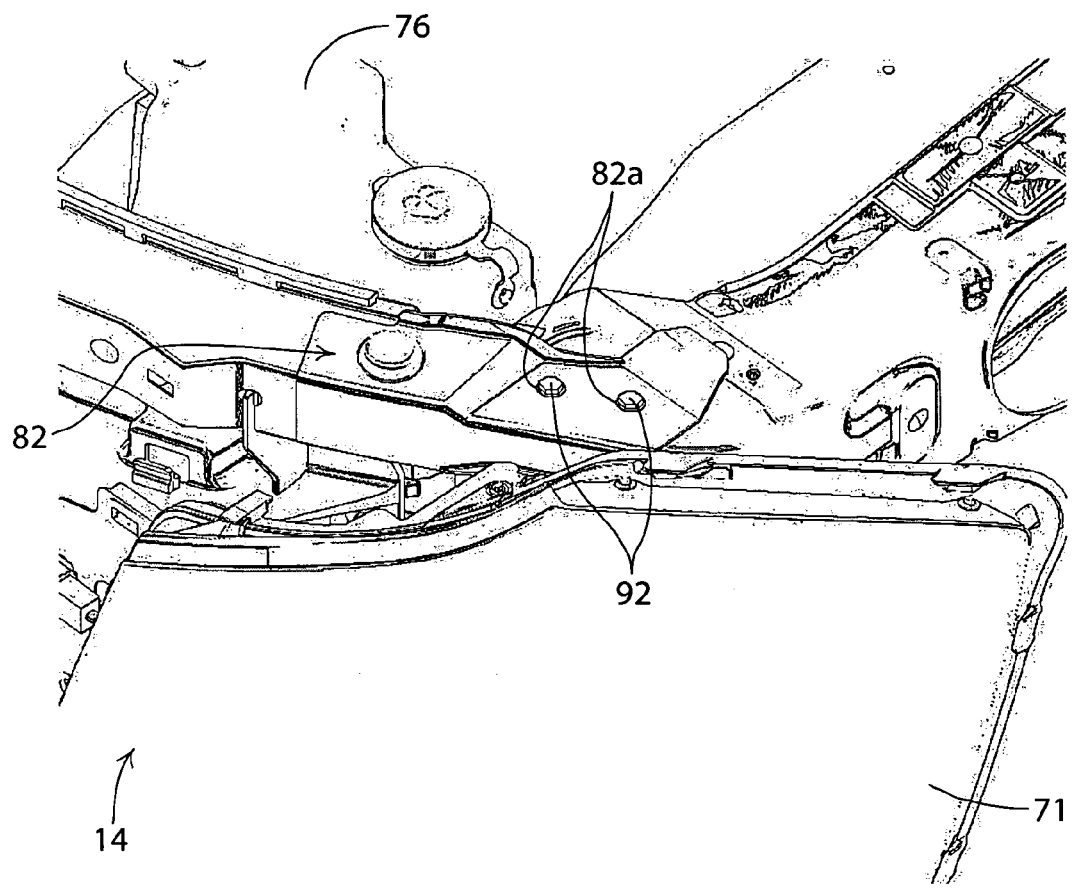
FIG. 23 is a partial top perspective view of the left hand side of the front end module coupled to the left hand side hood ledge in accordance with the present invention.
Figure 24:
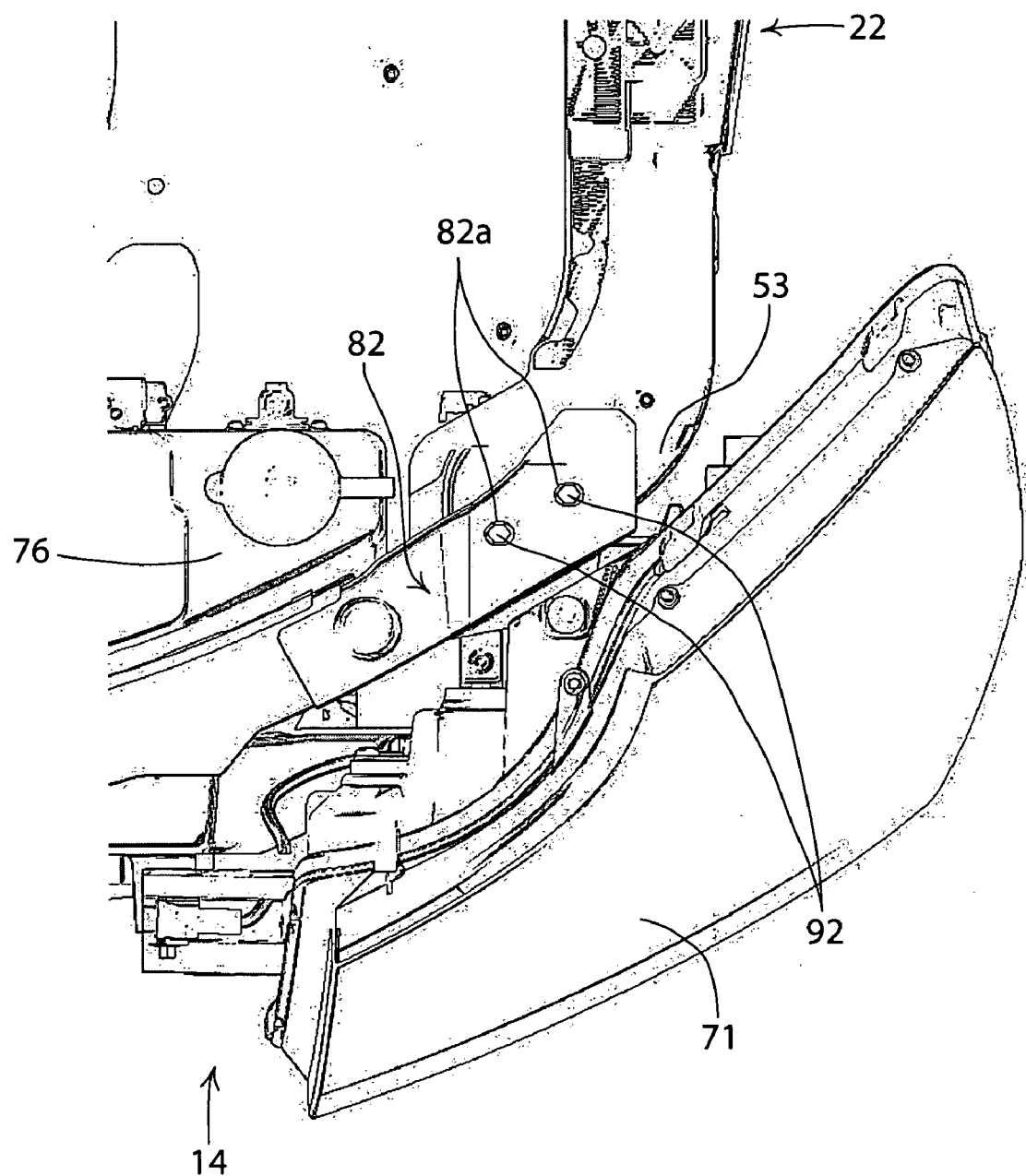
FIG. 24 is a top plan view of the left hand side of the front end module coupled to the left hand side hood ledge in accordance with the present invention.
Figure 25:
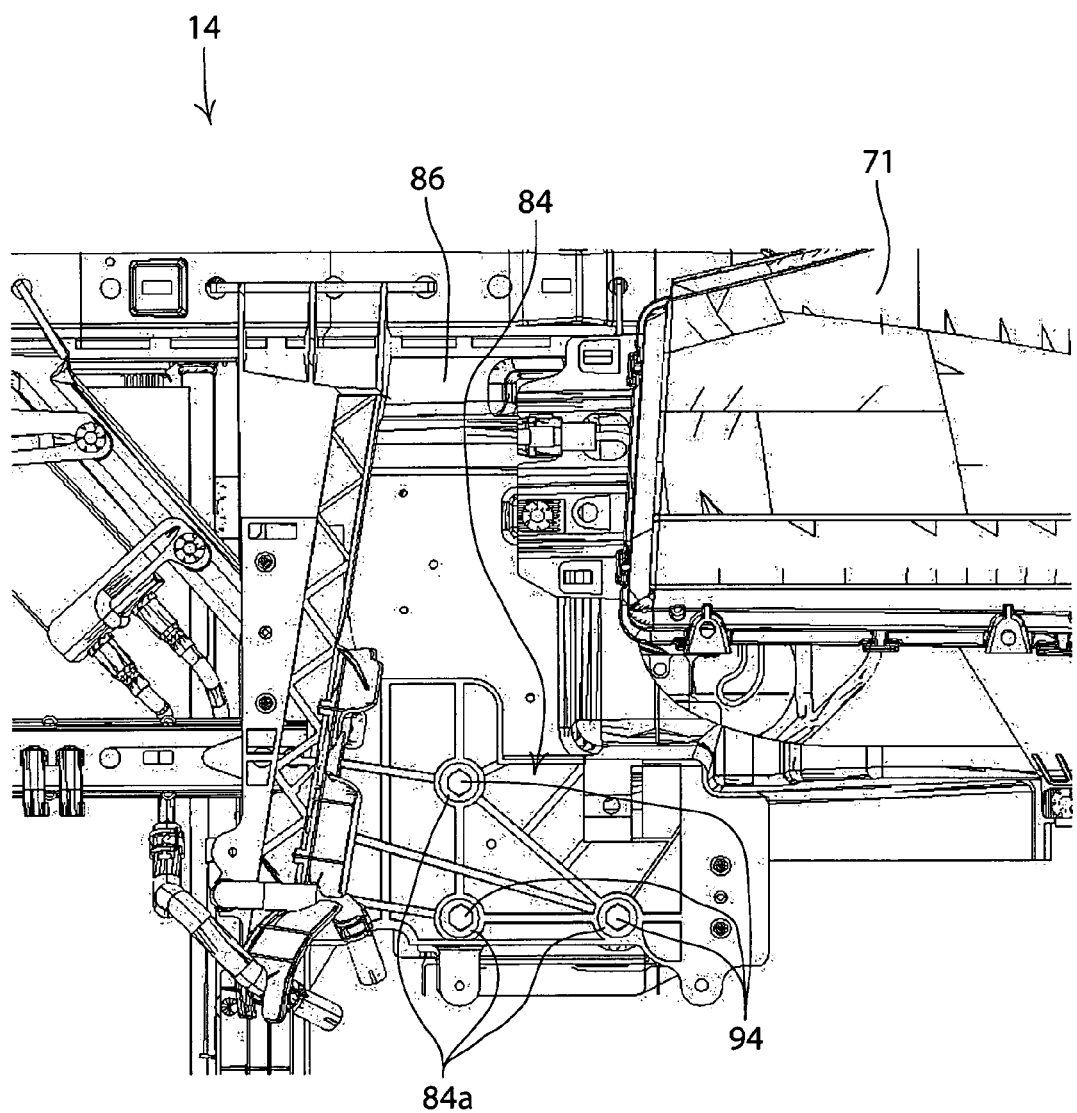
FIG. 25 is a front elevational view of the lower left hand side mounting portion of the front end module in accordance with the present invention.

The upper mounting members 81 and 82 are preferably constructed of hard rigid metallic materials such as steel that is fixedly coupled to the upper end of the radiator support 80. The upper right hand side mounting member 81 is provided with a pair of mounting holes 81a, while the upper left hand side mounting member 82 is provided with a pair of mounting holes 82a. As seen in FIGS. 20, 23, and 24, the mounting holes 81a and 82a receive fasteners 91 and 92, respectively, for fixedly coupling the upper end of the front end modular 14 to the front ends 33 and 53 of the hood ledge structures 21 and 22. In particular, the bolts 91 are inserted through the holes 81a and threaded into the holes 36 of the right hand side hood ledge structure 21 and the bolts 92 are inserted through the holes 82a of the upper mounting member 82 and threaded through the holes 56 of the left hand side hood ledge structure 22. The upper mounting members 81 and 82 are located laterally outwardly of the projection (guide) members 77 and 78, respectively, with respect to the center longitudinal axis of the vehicle 10.

The lower mounting members 83 and 84 are preferably constructed of hard rigid metallic materials such as steel that is fixedly coupled to the lower portion of the accessory support structures 85 and 86 of the radiator support 80. The lower right hand side mounting member 83 is provided with three mounting holes 83a, while the lower left hand side mounting member 84 is provided with three mounting holes 84a. As seen in FIGS. 5, 6, 21, 22 and 25, the mounting holes 83a and 84a receive fasteners 93 and 94, respectively, for fixedly coupling the lower end of the front end modular 14 to the front mounting structures 35 and 55 of the hood ledge structures 21 and 22. In particular, the bolts 93 are inserted through the holes 83a and threaded into the holes 37 of the right hand side hood ledge structure 21 and the bolts 94 are inserted through the holes 84a of the lower mounting member 84 and threaded through the holes 57 of the left hand side hood ledge structure 22. The lower mounting members 83 and 84 are located laterally inwardly of the projection (guide) members 77 and 78, respectively, with respect to the center longitudinal axis of the vehicle 10.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle front end structure comprising:
    a front end module support structure including a center support portion, a first side mounting portion located at a first lateral end of the center support portion and a second side mounting portion located at a second lateral end of the center support portion;
    a first side horizontal guide portion including a first horizontal planar surface extending in a horizontal direction of the front end module support structure and disposed adjacent the first side mounting portion;
    a first side vertical guide portion including a first vertical planar surface extending in a vertical direction of the front end module support structure and disposed adjacent the first side mounting portion;
    a second side horizontal guide portion including a second horizontal planar surface extending in the horizontal direction of the front end module support structure and disposed adjacent the second side mounting portion; and
    a second side vertical guide portion including a second vertical planar surface extending in the vertical direction of the front end module support structure and disposed adjacent the second side mounting portion.

2. The vehicle front end structure according to claim 1, wherein
    the first side horizontal guide portion and the first side vertical guide portion are formed on a first projection member that extends rearwardly from the front end module support structure; and
    the second side horizontal guide portion and the second side vertical guide portion are formed on a second projection member that extends rearwardly from the front end module support structure.

3. The vehicle front end structure according to claim 2, wherein
    the first and second projection members have L-shaped transverse cross sections.

4. The vehicle front end structure according to claim 1, wherein
    the first side mounting portion has a first upper mounting member and a first lower mounting member; and
    the second side mounting portion has a second upper mounting member and a second lower mounting member.

5. The vehicle front end structure according to claim 4, wherein
    the first and second lower mounting members are offset inwardly relative to the first and second upper mounting members towards a front to rear centerline of the vehicle front end structure.

6. The vehicle front end structure according to claim 5, wherein
    the first side horizontal guide portion and the first side vertical guide portion are formed on a first projection member that extends rearwardly from the front end module support structure; and
    the second side horizontal guide portion and the second side vertical guide portion are formed on a second projection member that extends rearwardly from the front end module support structure.

7. The vehicle front end structure according to claim 5, wherein
    the first side horizontal guide portion and the first side vertical guide portion are located adjacent the first lower mounting member; and
    the second side horizontal guide portion and the second side vertical guide portion are located adjacent the second lower mounting member.

8. The vehicle front end structure according to claim 7, wherein
    the first side horizontal guide portion and the first side vertical guide portion are formed on a first projection member that extends rearwardly from the front end module support structure; and
    the second side horizontal guide portion and the second side vertical guide portion are formed on a second projection member that extends rearwardly from the front end module support structure.

9. The vehicle front end structure according to claim 8, wherein
    the first and second projection members have L-shaped transverse cross sections.

10. The vehicle front end structure according to claim 1, wherein
    the center support portion is configured to form a radiator support and has a right hand side accessory support structure and a left hand side accessory support structure.

11. A vehicle front end structure comprising:
a first side hood ledge structure including a first front end mounting section having a first upper front end module attachment part, a first lower front end module attachment part and a first guide member, the first guide member having a first side vertical guide portion including a first vertical planar surface extending in a vertical direction and a first side horizontal guide portion including a first horizontal planar surface extending in a horizontal direction; and
a second side hood ledge structure with a second front end mounting section having a second upper front end module attachment part, a second lower front end module attachment part and a second guide member, the second guide member having a second side vertical guide portion including a second vertical planar surface extending in the vertical direction and a second side horizontal guide portion including a second horizontal planar surface extending in the horizontal direction.

12. The vehicle front end structure according to claim 11, wherein
the first side horizontal guide portion is disposed above the first lower front end module attachment part;
the first side vertical guide portion is disposed inwardly of the first upper front end module attachment part towards a front to rear centerline of the vehicle front end structure;
the second side horizontal guide portion is disposed above the second lower front end module attachment part; and
the second side vertical guide portion is disposed inwardly of the second upper front end module attachment part towards the front to rear centerline of the vehicle front end structure.

13. The vehicle front end structure according to claim 11, wherein
the first and second lower front end module attachment parts are offset inwardly relative to the first and second upper front end module attachment parts towards a front to rear centerline of the vehicle front end structure.

14. The vehicle front end structure according to claim 11, wherein
the first side horizontal guide portion and the first side vertical guide portion are formed by a first reinforcement plate; and
the second side horizontal guide portion and the second side vertical guide portion are formed by a second reinforcement plate.

15. The vehicle front end structure according to claim 14, wherein
the first and second reinforcement plates have generally L-shaped configurations.

16. The vehicle front end structure according to claim 15, wherein
the first and second lower front end module attachment parts are offset inwardly relative to the first and second upper front end module attachment parts towards a front to rear centerline of the vehicle front end structure.

17. The vehicle front end structure according to claim 16, wherein
the first side horizontal guide portion is disposed above the first lower front end module attachment part;
the first side vertical guide portion is disposed inwardly of the first upper front end module attachment part towards a front to rear centerline of the vehicle front end structure;
the second side horizontal guide portion is disposed above the second lower front end module attachment part; and
the second side vertical guide portion is disposed inwardly of the second upper front end module attachment part towards the front to rear centerline of the vehicle front end structure.

18. The vehicle front end structure according to claim 17, wherein
the first side horizontal guide portion and the first side vertical guide portion are located adjacent the first lower front end module attachment part; and
the second side horizontal guide portion and the second side vertical guide portion are located adjacent the second lower front end module attachment part.

19. The vehicle front end structure according to claim 11, wherein
the first and second upper front end module attachment parts are threaded holes having substantially non-horizontal axes; and
the first and second lower front end module attachment parts are threaded holes having substantially non-vertical axes.

20. The vehicle front end structure according to claim 11, wherein
the first side hood ledge structure further includes a first rear end section coupled to a first lateral end of a firewall structure, and a first vehicle frame mounting part; and
a second side hood ledge structure further includes a second rear end section coupled to a second lateral end of the firewall structure, and a second vehicle frame mounting part;
the first and second side hood ledge structures being configured and arranged to be separately supported by the firewall structure to form an unobstructed space between the first and second side hood ledge structures prior to installation of the vehicle front end structure onto a vehicle frame.

21. A vehicle front end structure comprising:
a vehicle body including a first side hood ledge structure with a first front end mounting section, a second side hood ledge structure with a second front end mounting section and a front end module guiding structure; and
a vehicle front end module being fixedly coupled to the first and second front end mounting sections of the vehicle body, the vehicle front end module including a front end module support structure including a center support portion, a first side mounting portion located at a first lateral end of the center support portion, a second side mounting portion located at a second lateral end of the center support portion and a vehicle body guiding structure configured and arranged to mate with the front end module guiding structure;
each of the front end module guiding structure and the vehicle body guiding structure including:
a first side horizontal guide portion including a first horizontal planar surface extending in a horizontal direction;
a first side vertical guide portion including a first vertical planar surface extending in a vertical direction;
a second side horizontal guide portion including a second horizontal planar surface extending in the horizontal direction; and
a second side vertical guide portion including a second vertical planar surface extending in the vertical direction.

22. The vehicle front end structure according to claim 21, wherein
the first side horizontal guide portion and the first side vertical guide portion of the front end module guiding structure are formed on a first projection member that extends rearwardly from the front end module support structure; and
the second side horizontal guide portion and the second side vertical guide portion of the front end module guiding structure are formed on a second projection member that extends rearwardly from the front end module support structure.

23. The vehicle front end structure according to claim 22, wherein
each of the first and second projection members of the front end module guiding structure has an L-shaped transverse cross section.

24. The vehicle front end structure according to claim 23, wherein
the first side horizontal guide portion and the first side vertical guide portion of the vehicle body are formed by a first reinforcement plate; and
the second side horizontal guide portion and the second side vertical guide portion of the vehicle body are formed by a second reinforcement plate.

25. The vehicle front end structure according to claim 24, wherein
the first and second reinforcement plates have generally L-shaped configurations.

26. The vehicle front end structure according to claim 21, wherein
the first side mounting section of the vehicle front end module has first upper and lower mounting members that mate with first upper and lower front end module attachment parts of the vehicle body; and
the second side mounting section of the vehicle front end module has second upper and lower mounting members that mate with second upper and lower front end module attachment parts of the vehicle body.

27. The vehicle front end structure according to claim 26, wherein
the first and second lower mounting members and the first and second lower front end module attachment parts are offset inwardly relative to the first and second upper mounting members and the first and second upper front end module attachment parts towards a front to rear centerline of the vehicle front end structure, respectively.

28. The vehicle front end structure according to claim 27, wherein
the first side horizontal guide portion and the first side vertical guide portion of the front end module guiding structure are formed on a first projection member that extends rearwardly from the front end module support structure;
the second side horizontal guide portion and the second side vertical guide portion of the front end module guiding structure are formed on a second projection member that extends rearwardly from the front end module support structure;
the first side horizontal guide portion and the first side vertical guide portion of the vehicle body are formed by a first reinforcement plate that is configured and arranged to support the first projection member during installation of the vehicle front end module onto the vehicle body; and
the second side horizontal guide portion and the second side vertical guide portion of the vehicle body are formed by a second reinforcement plate that is configured and arranged to support the second projection member during installation of the vehicle front end module onto the vehicle body.

29. The vehicle front end structure according to claim 26, wherein
the first and second upper front end module attachment parts are attached to the first and second upper mounting members by upper fasteners that have substantially non-horizontal axes; and
the first and second lower front end module attachment parts are attached to the first and second lower mounting members by upper fasteners that have substantially non-vertical axes.

30. The vehicle front end structure according to claim 21, wherein
the first side hood ledge structure further includes a first rear end section coupled to a first lateral end of a firewall structure, and a first vehicle frame mounting part; and
the second side hood ledge structure further includes a second rear end section coupled to a second lateral end of the firewall structure, and a second vehicle frame mounting part;
the first and second side hood ledge structures being configured and arranged to be separately supported by the firewall structure to form an unobstructed space between the first and second side hood ledge structures prior to installation of the vehicle front end module onto the vehicle body and prior to installation of the vehicle body onto a vehicle frame.

31. A vehicle front end structure comprising:
a firewall structure having a first lateral end and a second lateral end;
a first side hood ledge structure including a first rear end section coupled to the first lateral end of the firewall structure, and a first front end mounting section having a first upper front end module attachment part, a first lower front end module attachment part and a first vehicle frame mounting part, the first side hood ledge structure further including a first guide member having a first side vertical guide portion including a first vertical planar surface extending in a vertical direction and a first side horizontal guide portion including a first horizontal planar surface extending in a horizontal direction; and
a second side hood ledge structure with a second rear end section coupled to the second lateral end of the firewall structure, and a second front end mounting section having a second upper front end module attachment part, a second lower front end module attachment part and a second vehicle frame mounting part, the second side hood ledge structure a second guide member having a second side vertical guide portion including a second vertical planar surface extending in the vertical direction and a second side horizontal guide portion including a second horizontal planar surface extending in the horizontal direction;
the first and second side hood ledge structures being configured and arranged to be separately supported by the firewall structure to form an unobstructed space between the first and second side hood ledge structures.

32. The vehicle front end structure according to claim 31, wherein
- the first side horizontal guide portion and the first side vertical guide portion are formed by a first reinforcement plate; and
- the second side horizontal guide portion and the second side vertical guide portion are formed by a second reinforcement plate.

33. The vehicle front end structure according to claim 32, wherein the first and second reinforcement plates have generally L-shaped configurations.

34. The vehicle front end structure according to claim 31, wherein
- the first side horizontal guide portion is disposed above the first lower front end module attachment part;
- the first side vertical guide portion is disposed inwardly of the first upper front end module attachment part towards a front to rear centerline of the vehicle front end structure;
- the second side horizontal guide portion is disposed above the second lower front end module attachment part; and
- the second side vertical guide portion is disposed inwardly of the second upper front end module attachment part towards the front to rear centerline of the vehicle front end structure.

35. The vehicle front end structure according to claim 31, wherein
- the first and second lower front end module attachment parts are offset inwardly relative to the first and second upper front end module attachment parts towards a front to rear centerline of the vehicle front end structure.

36. The vehicle front end structure according to claim 35, wherein
- the first side horizontal guide portion is disposed above the first lower front end module attachment part;
- the first side vertical guide portion is disposed inwardly of the first upper front end module attachment part towards a front to rear centerline of the vehicle front end structure;
- the second side horizontal guide portion is disposed above the second lower front end module attachment part; and
- the second side vertical guide portion is disposed inwardly of the second upper front end module attachment part towards the front to rear centerline of the vehicle front end structure.

37. The vehicle front end structure according to claim 35, wherein
- the first side horizontal guide portion and the first side vertical guide portion are located adjacent the first lower front end module attachment part; and
- the second side horizontal guide portion and the second side vertical guide portion are located adjacent the second lower front end module attachment part.

38. The vehicle front end structure according to claim 31, wherein
- the first and second upper front end module attachment parts are threaded holes having substantially non-horizontal axes; and
- the first and second lower front end module attachment parts are threaded holes having substantially non-vertical axes.

* * * * *